US008680967B2

(12) United States Patent
Fukuta et al.

(10) Patent No.: US 8,680,967 B2
(45) Date of Patent: Mar. 25, 2014

(54) CONTENT DISTRIBUTION SYSTEM, SERVER COMPUTER AND RECORDING MEDIUM

(75) Inventors: Shigeki Fukuta, Kawasaki (JP); Tatsuro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 843 days.

(21) Appl. No.: 12/405,476

(22) Filed: Mar. 17, 2009

(65) Prior Publication Data

US 2009/0261944 A1 Oct. 22, 2009

(30) Foreign Application Priority Data

Mar. 17, 2008 (JP) ................................. 2008-068449

(51) Int. Cl.
*G05B 23/00* (2006.01)

(52) U.S. Cl.
USPC .......................................................... 340/5.8

(58) Field of Classification Search
USPC ................. 340/5.8, 7.29, 7.31, 7.52
See application file for complete search history.

(56) References Cited

U.S. PATENT DOCUMENTS 6,961,099 B2 * 11/2005 Takano et al. ................. 348/705

FOREIGN PATENT DOCUMENTS

| JP | 2002-279394 A | 9/2002 |
| JP | 2004-164129 A | 6/2004 |
| JP | 2005-267483 | 9/2005 |
| JP | 2006-4318 | 1/2006 |
| JP | 2006-72812 | 3/2006 |
| JP | 2007-142834 | 6/2007 |

OTHER PUBLICATIONS

"Did you know that two types of Scanner-equipped Whiteboards are available?",http://www.itmedia.co.jp/bizid/articles/0703/19/news105.html header of p. 1, paragraph 3-5 of p. 3, Mar. 19, 2007, translated header of p. 1 and paragraph 3-5 of p. 3.
Yasuyuki Sasaki, "Enjoy Your Photographs Thoroughly with Digital Travel Memories", Yomiuri PC, vol. 12, Issue 10, Japan Yomiuri Shimbun head office Tokyo, Aug. 28, 2007, pp. 48-49.
Japanese Office Action mailed Mar. 13, 2012 for corresponding Japanese Application No. 2008-068449, with Partial English-language Translation.

* cited by examiner

*Primary Examiner* — Vernal Brown
(74) *Attorney, Agent, or Firm* — Fujitsu Patent Center

(57) ABSTRACT

A server computer includes a receiving part for receiving a content and apparatus identification information of an apparatus that existed in a vicinity when the content was generated; an extracting part for extracting identification information corresponding to the apparatus identification information received by the receiving part by referring to a database in which the identification information is stored in association with the apparatus identification information; a storing part for storing the content and apparatus identification information received by the receiving part and the identification information extracted by the extracting part in an associated manner in the storage unit; and a first sending part for sending the content stored in the storage unit to another information processor corresponding to identification information received from outside when the identification information received from the outside matches the identification information stored in the storage unit.

13 Claims, 35 Drawing Sheets

FIG. 3

| IMAGE ID | IMAGE DATA | PHOTOGRAPHING DATE / TIME | APPARATUS ID | RECEPTION STRENGTH |
|---|---|---|---|---|
| I001 | ... | 02/07/10:30:30 | C3B | STRONG |
| | | | C3C | STRONG |
| | | | P3D | MEDIUM |
| | | | C3E | WEAK |
| I002 | ... | ... | ... | . |

| APPARATUS ID | USER ID | MAIL ADDRESS |
|---|---|---|
| C3B | U003B | ..... |
| C3C | U003C | ..... |
| P3D | U003D | ..... |
| C3E | U003E | ..... |
| ... | | |

FIG. 7

| CONTENT DB ~153 | | | | | | | |
|---|---|---|---|---|---|---|---|
| USER ID | U003A | | | | | | |
| TOPIC 1 | TOPIC 2 | TOPIC 3 | ... | | | | |
| IMAGE ID | IMAGE DATA | TEXT | PHOTOGRAPHING DATE / TIME | APPARATUS ID | USER ID | | |
| I001 | ... | ... | 02/07/10:30:30 | C3B | U003B | | |
| | | | | C3C | U003C | | |
| | | | | P3D | U003D | | |
| I002 | ... | ... | ............ | ... | ... | | |
| USER ID | U003B | | | | | | |
| TOPIC 1 | TOPIC 2 | TOPIC 3 | ... | | | | |
| IMAGE ID | IMAGE DATA | TEXT | PHOTOGRAPHING DATE / TIME | APPARATUS ID | USER ID | | |
| ... | ... | ... | ... | ... | ... | | |

FIG. 8

| DISCLOSURE DB 154 | |
|---|---|
| USER ID | TRANSMISSION TARGET |
| U003A | U003B |
| | U003D |
| | ..... |
| U005A | |

FIG. 19

HISTORY FILE 254A

| FILE NAME | CREATION START DATE/TIME | CREATION END DATE/TIME | APPARATUS ID | DETECTION DATE/TIME |
|---|---|---|---|---|
| FEBRUARY 10TH PROCEEDINGS | 02/10/10:00:00 | | PC02B,PC02C | — |
| | | | PC02B,PC02C | 02/10/10:00:10 |
| | | | ⋮ | ⋮ |
| | | | PC02B,PC02C PC02D | 02/10/10:10:00 |
| | | | ⋮ | ⋮ |
| | | 02/10/10:30:00 | PC02B,PC02C | — |
| ⋮ | ⋮ | | | |

| HISTORY FILE | | | | |
|---|---|---|---|---|
| FILE NAME | CREATION START DATE / TIME | CREATION END DATE / TIME | APPARATUS ID | DETECTION DATE / TIME |
| XXX | 02/10/10:00:00 | | PC02B,PC02C | 02/10/10:00:00 |
| | | | PC02B,PC02C | 02/10/10:00:10 |
| | | | ⋮ | ⋮ |
| | | | PC02B,PC02C PC02D | 02/10/20:00:00 |
| | | | ⋮ | ⋮ |
| | | 02/10/10:30:00 | PC02B,PC02C | 02/10/10:30:00 |
| ⋮ | ⋮ | | | |

FIG. 27

CONTENT DB — 153

| USER ID | U003A | | | | | | |
|---|---|---|---|---|---|---|---|
| TOPIC 1 | TOPIC 2 | TOPIC 3 | ... | | | | |
| IMAGE ID | IMAGE DATA | TEXT | PHOTOGRAPHING DATE/TIME | APPARATUS ID | USER ID | VIEWING USER ID |
| I001 | ... | ... | 02/07/10:30:30 | C3B | U003B | U003B, U003C |
| | | | | C3C | U003C | U003D, U003E |
| I002 | ... | ... | 02/07/10:32:30 | P3D | U003D | |
| | | | | C3B | U003B | U003B, U003C |
| | | | | C3C | U003C | U003D, U003E |
| I003 | ... | ... | ... | C3E | U003E | |
| ... | | | ... | ... | ... | ... |

| USER ID | U003B | | | | | | |
|---|---|---|---|---|---|---|---|
| TOPIC 1 | TOPIC 2 | TOPIC 3 | ... | | | | |
| IMAGE ID | IMAGE DATA | TEXT | PHOTOGRAPHING DATE/TIME | APPARATUS ID | USER ID | VIEWING USER ID |
| ... | ... | ... | ... | ... | ... | ... |

FIG. 31

CONTENT DB — 153

| USER ID | U003A | | | | | | |
|---|---|---|---|---|---|---|---|
| TOPIC 1 | TOPIC 2 | TOPIC 3 | ... | | | | |
| IMAGE ID | IMAGE DATA | TEXT | PHOTOGRAPHING DATE/TIME | APPARATUS ID | USER ID | ADDITIONAL VIEWING USER ID | |
| I001 | ... | ... | 02/07/10:30:30 | C3B | U003B | U003C, U003E | |
| ... | ... | ... | ... | ... | ... | ... | |

| USER ID | U003B | | | | | | |
|---|---|---|---|---|---|---|---|
| TOPIC 1 | TOPIC 2 | TOPIC 3 | ... | | | | |
| IMAGE ID | IMAGE DATA | TEXT | PHOTOGRAPHING DATE/TIME | APPARATUS ID | USER ID | VIEWING USER ID | |
| I003 | ... | ... | 02/07/10:20:20 | C3A | U003A | | |
| I004 | ... | ... | 02/07/10:25:30 | C3C, C3E | U003C, U003E | | |
| ... | ... | ... | ... | ... | ... | | |

CONTENT DISTRIBUTION SYSTEM, SERVER COMPUTER AND RECORDING MEDIUM

CROSS-REFERENCE TO RELATED APPLICATIONS

This application is based upon and claims the benefit of priority of the prior Japanese Patent Application No. 2008-068449, filed on Mar. 17, 2008, the entire contents of which are incorporated herein by reference.

FIELD

The embodiments discussed herein are related to a content distribution system, a server computer, and a recording medium.

BACKGROUND

Recently, services which provide a place for communication through a human network based on a trust relationship between users have become increasingly popular. One such service is called Social Networking Service (hereinafter referred to as "SNS"), and various SNSs are provided by carriers. In SNS, unlike normal web sites and blogs, a range of disclosure in which information such as user's profile, diary, and photograph is disclosed can be specified. Specifically, a range of disclosure can be specified such that information is disclosed only among the user's friends, friends of the user's friend, or the like. By specifying a range of disclosure like this, communication among specific users can be established. For example, examples of this technique have been disclosed in Japanese Patent-Laid Open No. 2006-4318 and Japanese Patent-Laid Open No. 2006-72812.

SUMMARY

In relation to SNS, an interaction called an off-line meeting may be held in the real world, and a content may be generated also in such a meeting. However, since conventional SNS is intended for distribution and reception of online information, there is a problem that a content generated in an off-line meeting cannot be processed efficiently.

The present invention is made in view of the above described circumstances, and an object of the present invention is to provide a content distribution system, a server computer, and a program which detects apparatus identification information of another apparatus existing in the vicinity and manages the apparatus identification information in association with a generated content so that the generated content can be easily disclosed to a desired user.

One aspect of a content distribution system is a content distribution system which stores a content generated by an apparatus in a storage unit by a server computer and sends the stored content to an information processor. The apparatus includes a detecting unit for detecting apparatus identification information of another apparatus existing in a vicinity; and a method for storing the apparatus identification information detected by the detecting unit in association with the content when the content is generated. The information processor includes a method for sending the content and apparatus identification information stored by the storing method to the server computer. The server computer includes a receiving unit for receiving the content and apparatus identification information sent from the information processor; an extracting unit for extracting identification information corresponding to the apparatus identification information received by the receiving unit by referring to a database in which the identification information is stored in association with the apparatus identification information; a storing unit for storing the content and apparatus identification information received by the receiving unit and the identification information extracted by the extracting unit in an associated manner in the storage unit; and a sending unit for sending the content stored in the storage unit to another information processor corresponding to identification information received from outside when the identification information received from the outside matches the identification information stored in the storage unit.

According to one aspect of the content distribution system, the apparatus generates a content and detects apparatus identification information of another apparatus existing in the vicinity by the detecting unit. The information processor sends the content and apparatus identification information to the server computer. The receiving unit of the server computer receives the content and apparatus identification information. A database has stored identification information in association with apparatus identification information. The extracting unit extracts the identification information corresponding to the received apparatus identification information by referring to the database. The storing unit stores the content and apparatus identification information received by the receiving unit and the identification information extracted by the extracting unit in an associated manner in the storage unit. When identification information is received from outside, if the received identification information matches the identification information stored in the storage unit, the content stored in the storage unit is sent to the information processor corresponding to the identification information received from the outside.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an explanatory diagram of memory contents of a memory card;

FIG. 6 illustrates an explanatory diagram of a record layout of a DB;

FIG. 7 illustrates an explanatory diagram of a record layout of a content DB;

FIG. 8 illustrates an explanatory diagram of a display image of image data;

FIG. 19 illustrates an explanatory diagram of a record layout of a history file;

FIG. 25 illustrates an explanatory diagram of a record layout of a history file according to embodiment 3;

FIG. 27 illustrates an explanatory diagram of a record layout of a content DB;

FIG. 31 illustrates an explanatory diagram of a record layout of a content DB according to embodiment 5;

DESCRIPTION OF EMBODIMENT(S)

Embodiment 1

Figure 1:
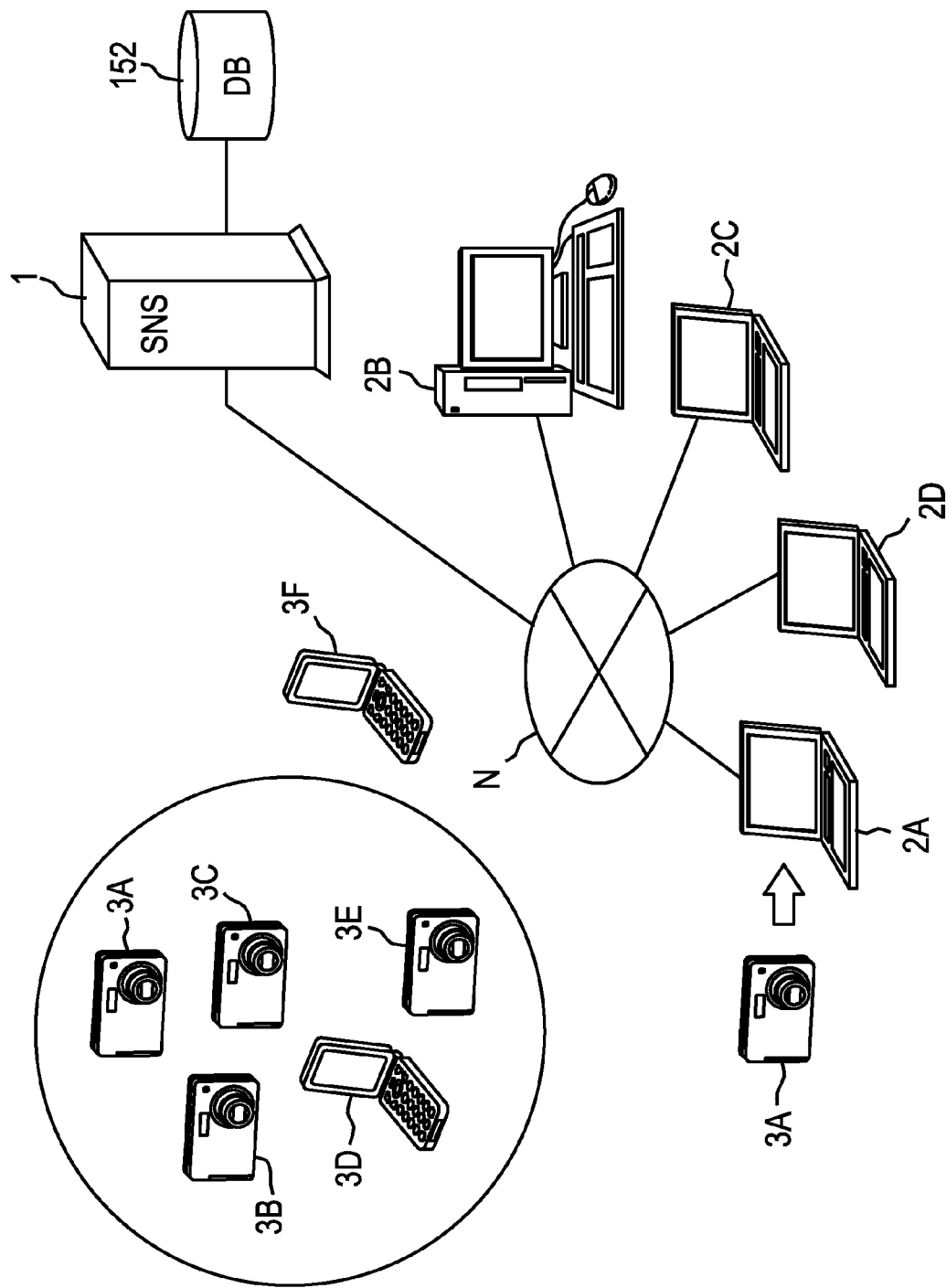
FIG. 1 illustrates a schematic diagram of a content distribution system.

FIG. 1 is a schematic diagram of a content distribution system. The content distribution system includes information processor 2A, 2B, 2C, 2D, (hereinafter represented as 2 in some cases) and so on used by users; a communication network N such as the Internet, a mobile telephone network, and the like; a server computer 1; a database (hereinafter referred to as DB) 152; and apparatuses 3A to 3F (hereinafter represented as 3 in some cases). The information processor 2 may be, for example, a personal computer, a PDA (Personal Digital Assistant), or a mobile telephone. In the following description, the information processor 2 is assumed to be a personal computer 2. The server computer 1 and the personal computer 2 are connected through the communication network N, and send information for SNS to each other using a protocol such as HTTP (HyperText Transfer Protocol).

The apparatus 3 may generate contents such as image data, video data, text data, and music data, and may be a digital camera, a mobile telephone, a digital video camera, a recorder, a music player, a portable game machine, a PDA, or the like. In the following description, image data that is a content photographed by a digital camera is used as an example. Further, the apparatuses 3A, 3B, 3C, and 3E are referred to as cameras 3A, 3B, 3C, and 3E, and the apparatuses 3D and 3F are referred to as camera-equipped mobile telephones 3D and 3F.

The outline of the content distribution system will be described. It is assumed here that a user having the camera 3A and another user having the camera 3B and the portable telephone 3D have gone camping. When the user takes a photograph using the camera 3A, the camera 3A detects neighbor apparatus 3 using a wireless LAN (Local Area Network) such as Wi-Fi(R), or a short range wireless communication technology such as Bluetooth (R) or UWB (Ultra Wide Band) or ZigBee (R). In the present embodiment, Wi-Fi is used, and another apparatus 3 is detected in the range of about 30 m, but the present invention is not limited thereto.

The camera 3A detects the camera 3B, the camera 3C, the mobile telephone 3D, and the camera 3E in the vicinity, that is, within the circle shown in FIG. 1, and acquires apparatus identification information (hereinafter referred to as apparatus ID) which is assigned uniquely to the camera 3B, the camera 3C, the mobile telephone 3D, and the camera 3E. The camera 3A stores photographed image data and apparatus ID. The user of the camera 3A sends the photographed data and the apparatus ID to the server computer 1 using the personal computer 2A. The DB 152 stores identification information for identifying a user belonging to SNS (hereinafter referred to as user ID) in association with the apparatus ID.

Figure 2:
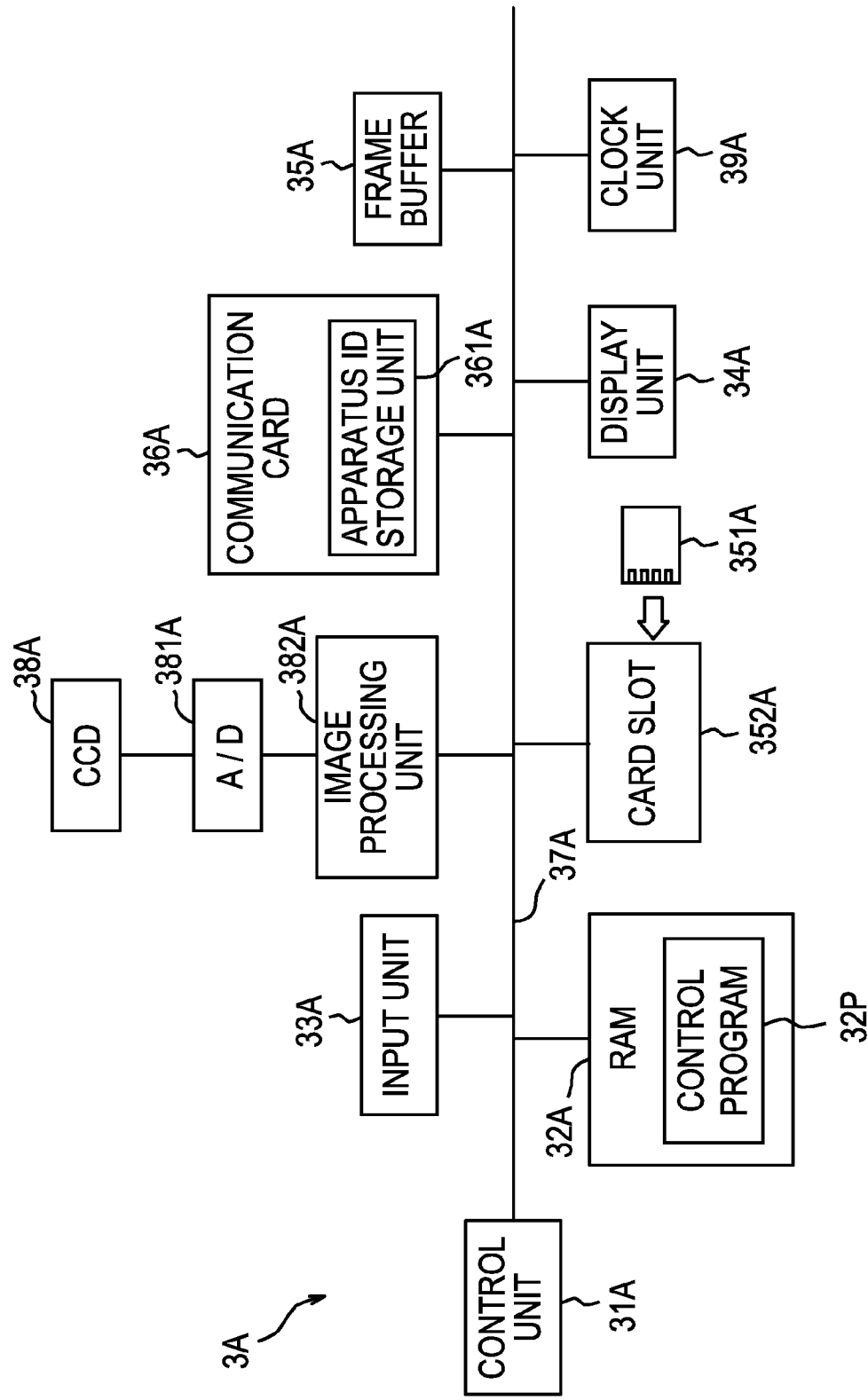
FIG. 2 illustrates a block diagram of a hardware configuration of a camera.

The server computer 1 reads out the user ID corresponding to the apparatus ID. Then, the server computer 1 stores the image data and the user ID in an associated manner. The user who has gone camping and uses the camera 3B and the personal computer 2B accesses the server computer 1. Since the relevant user's user ID has been stored in association with the image data, the image data can be downloaded to the personal computer 2B. In this way, this system allows image data to be disclosed to the appropriate user even if the user of the camera 3A does not specify a user to which image data is disclosed in the SNS. This will be described in detail below. FIG. 2 is a block diagram of a hardware configuration of the camera 3A. The camera 3A includes a control unit 31A, a RAM (Random Access Memory) 32A, an input unit 33A, a display unit 34A, a frame buffer 35A, a card slot 352A, a communication card 36A, a CCD (Charge-Coupled Device) 38A, an A/D 381A, a clock unit 39A, and an image processing unit 382A, and the like. The control unit 31A constructed of an MPU (Micro Processing Unit) and the like is connected to each of the hardware elements through a bus 37A and controls them, and executes various software-like functions according to a control program 32P stored in the RAM 32A.

The display unit 34A may be, for example, a liquid crystal display or an electroluminescence display. The input unit 33A includes various operation buttons, a touch panel, or the like. As the communication card 36A, a wireless LAN card compliant with IEEE 802.11a/b/g standard, for example, an Eye-Fi Card ® may be used. In a memory (not shown) inside the communication card 36A, an apparatus ID storage unit 361A is provided and stores an apparatus ID assigned uniquely to the communication card 36A. While in the present embodiment, an apparatus ID of the communication card 36A is used as information for identifying the camera 3A, the present invention is not limited thereto. For example, a MAC (Media Access Control) address assigned to the camera 3A, a telephone number of the mobile telephone 3D, or a number assigned to an IC (Integrated Circuit) card included in the mobile telephone 3D may be used.

The CCD 38A captures an image according to the operation on the input unit 33A. The CCD 38A converts a received optical signal to an analog electrical signal and outputs the analog electrical signal to the A/D 381A. The A/D 381A digitizes the analog electrical signal, and outputs the digitized image data to the image processing unit 382A. The image processing unit 382A performs image processing such as color correction on the image data, and then outputs the image data to the frame buffer 35A. The frame buffer 35A stores the image data.

The card slot 352A is an insertion slot for a memory card 351A composed of a flash memory or the like. According to an instruction of the control unit 31A, image data stored in the frame buffer 35A is written in the memory card 351A inserted into the card slot 352A. Together with the image data, the control unit 31A stores an image ID for identifying the image data and the photographing date/time thereof in the memory card 351A with reference to date/time information outputted from the clock unit 39A.

When the input unit 33A outputs a signal indicating a start of photographing, the control unit 31A instructs the communication card 36A to detect another apparatus 3 existing in the vicinity (hereinafter referred to as a communication zone) when the capturing of the images by the CCD 38A occurs. The communication card 36A receives the apparatus ID of the detected apparatus 3, and stores identification information of the received apparatus ID in association with the photographed image data in the memory card 351A. In addition to receiving the apparatus ID, the communication card 36A calculates a Received Signal Strength Indication (hereinafter referred to as a RSSI) of each apparatus 3 based on a field intensity from the other detected apparatuses 3. The control unit 31A stores the calculated RSSI together with the above apparatus ID in the memory card 351A.

Although in the present embodiment, an operation of a shutter button (not shown) of the input unit 33A triggers reception of the ID of an apparatus 3 existing in a communication zone, the present invention is not limited thereto, and an apparatus ID may be received within a certain time period after an operation of the shutter button. Further, the input unit 33A may cause the communication card 36A to receive an apparatus ID after power-on. In this case, the communication card 36A may store, in the RAM 32A, as a history the received apparatus ID and the calculated RSSI together with a photographing date/time information outputted from the clock unit 39A. When the control unit 31A stores the image data together with the photographing date/time in the memory card 351A, the control unit 31A reads out an apparatus ID and RSSI corresponding to the photographing date/time. Then, the control unit 31A stores the image data, photographing date/time, apparatus ID and RSSI in the memory card 351A.

FIG. 3 is an explanatory diagram of memory contents of the memory card 351A. In the memory card 351A, an image ID, a photographing date/time, an apparatus ID, and a RSSI are stored in association with image data. Each data of an image ID, a photographing date/time, an apparatus ID, and a RSSI is stored with respect to image data based on an Exif standard or the like. In this example, an image ID of image data photographed at February 7th, 10:30:30 (year is omitted) is stored, and the apparatus ID and RSSI of apparatus 3 existing in a communication zone at this time point are stored.

The apparatuses 3 detected here are four apparatuses: the camera 3B, the camera 3C, the mobile telephone 3D, and the camera 3E. The camera 3B has apparatus ID "C3B" and a "strong" RSSI. The camera 3C has apparatus ID "C3C" and a "strong" RSSI. The mobile telephone 3D has apparatus ID "P3D" and a "medium" RSSI. The camera 3E has apparatus ID "C3E" and a "weak" RSSI. In this example, RSSI is classified into three strengths "strong", "medium", or "weak" for ease of explanation, but it is not limited as such. The control unit 31A deletes ID of apparatus 3 whose RSSI is less than or equal to a specific value, and stores the remaining apparatus ID, image ID, image data, and photographing date/time in the memory card 351A.

Since the ID of an apparatus whose RSSI is less than or equal to a specific value is deleted as described above, a user having little association with the user who has generated the image data can be excluded. Although in the present embodiment, the control unit 31A of the camera 3A deletes the ID of an apparatus whose RSSI is weak, it is understood that the server computer 1 may also delete it. As the above described processing is repeated, image data and information of apparatus 3 in the vicinity are collected in the memory card 351A.

Figure 4:
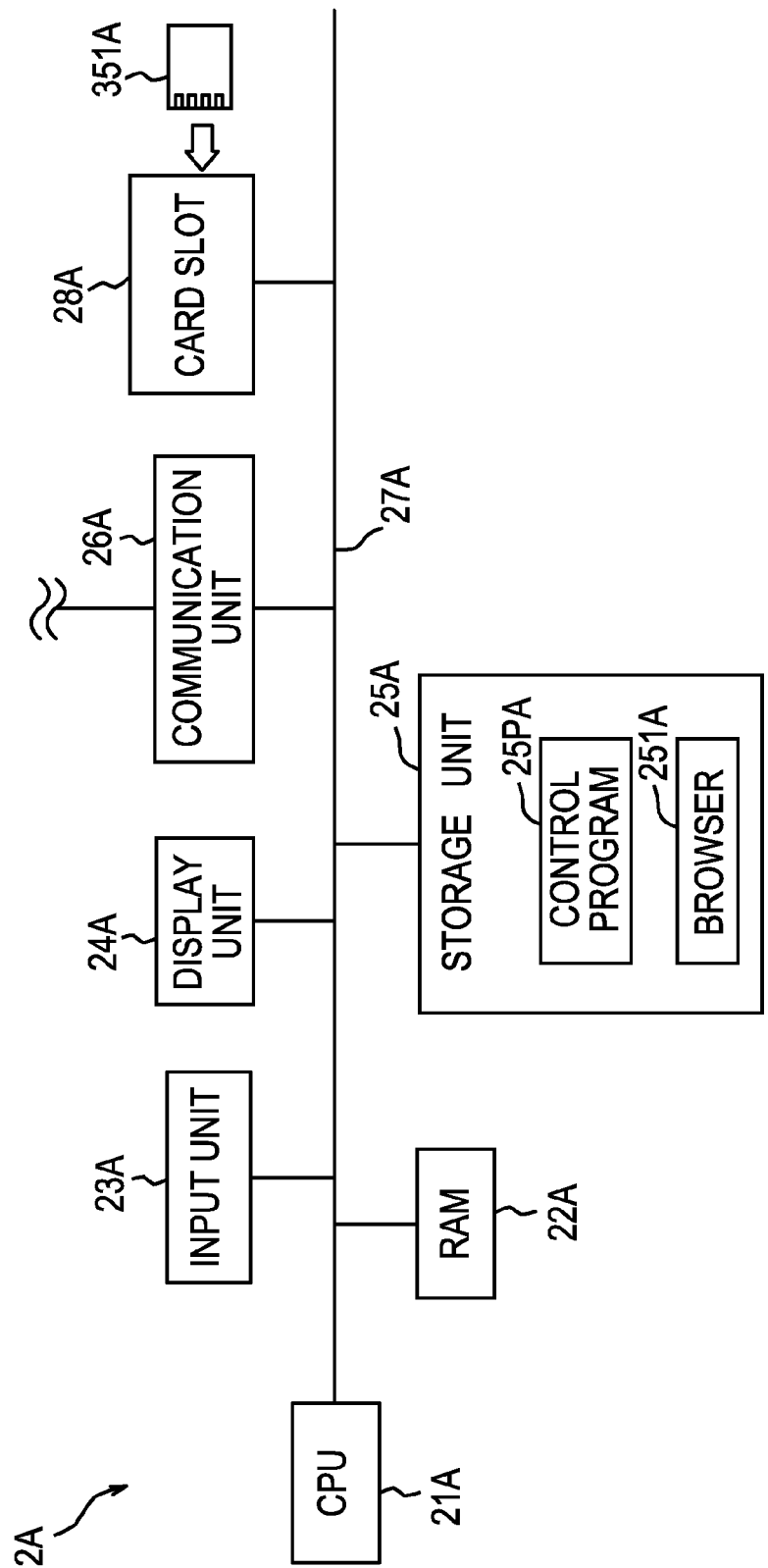
FIG. 4 illustrates an explanatory diagram of a hardware configuration of a personal computer.

FIG. 4 is an explanatory diagram of a hardware configuration of the personal computer 2A. The personal computer 2A includes a CPU (Central Processing Unit) 21A as a control unit, a RAM 22A, an input unit 23A, a display unit 24A, a communication unit 26A, a card slot 28A, a storage unit 25A, and the like. The CPU 21A is connected to and controls each hardware element of the personal computer 2A through a bus 27A, and executes various software-like functions according to a control program 25PA stored in the storage unit 25A.

The display unit 24A may be a liquid crystal display, for example. The input unit 23A may be composed of, for example, a keyboard and a mouse. The communication unit 26A may be a modem, a LAN card, or the like, and sends and receives information to and from the server computer 1 using a protocol such as HTTP. The storage unit 25A may be, for example, a hard disk or a large capacity memory. In the storage unit 25A, a browser 251A such as Internet Explorer (R) is stored. The CPU 21A starts up the browser 251A according to an instruction from the input unit 23A. The CPU 21A sends a URL of the SNS related to the server computer 1 which is inputted from the input unit 23A, to the server computer 1 through the communication unit 26A, thereby establishing communication with the server computer 1.

The CPU 21A accepts a user ID and a password inputted from the input unit 23A and sends them to the server computer 1. Thereby, the personal computer 2A is allowed to log into the SNS. The memory card 351A illustrated in FIG. 2 is inserted in the card slot 28A. The CPU 21A reads out the apparatus ID, image ID, image data, and photographing date/time stored in the memory card 351A, and sends them to the server computer 1 through the communication unit 26A. In this case, the CPU 21A sends the user ID as identification information of a generator to the server computer 1.

Although in the present embodiment, image data photographed by the camera 3A is transferred to the personal computer 2A using the memory card 351A, the present invention is not limited thereto. For example, image data may be outputted through a USB (Universal Serial Bus) cable to the personal computer 2A, or may be sent wirelessly by an Eye-Fi card or Bluetooth as the communication card 36A to the personal computer 2A. Although in the present embodiment, image data is sent to the server computer 1 by the personal computer 2A since the camera 3A does not have a function to send/receive information through the communication network N, the present invention is not limited thereto. For example, image data that is photographed by the mobile telephone 3D and an apparatus ID may be received by similar processing, and then the image data, apparatus ID, and the like may be sent by the mobile telephone 3D from the browser through the communication network N to the server computer 1.

Figure 5:
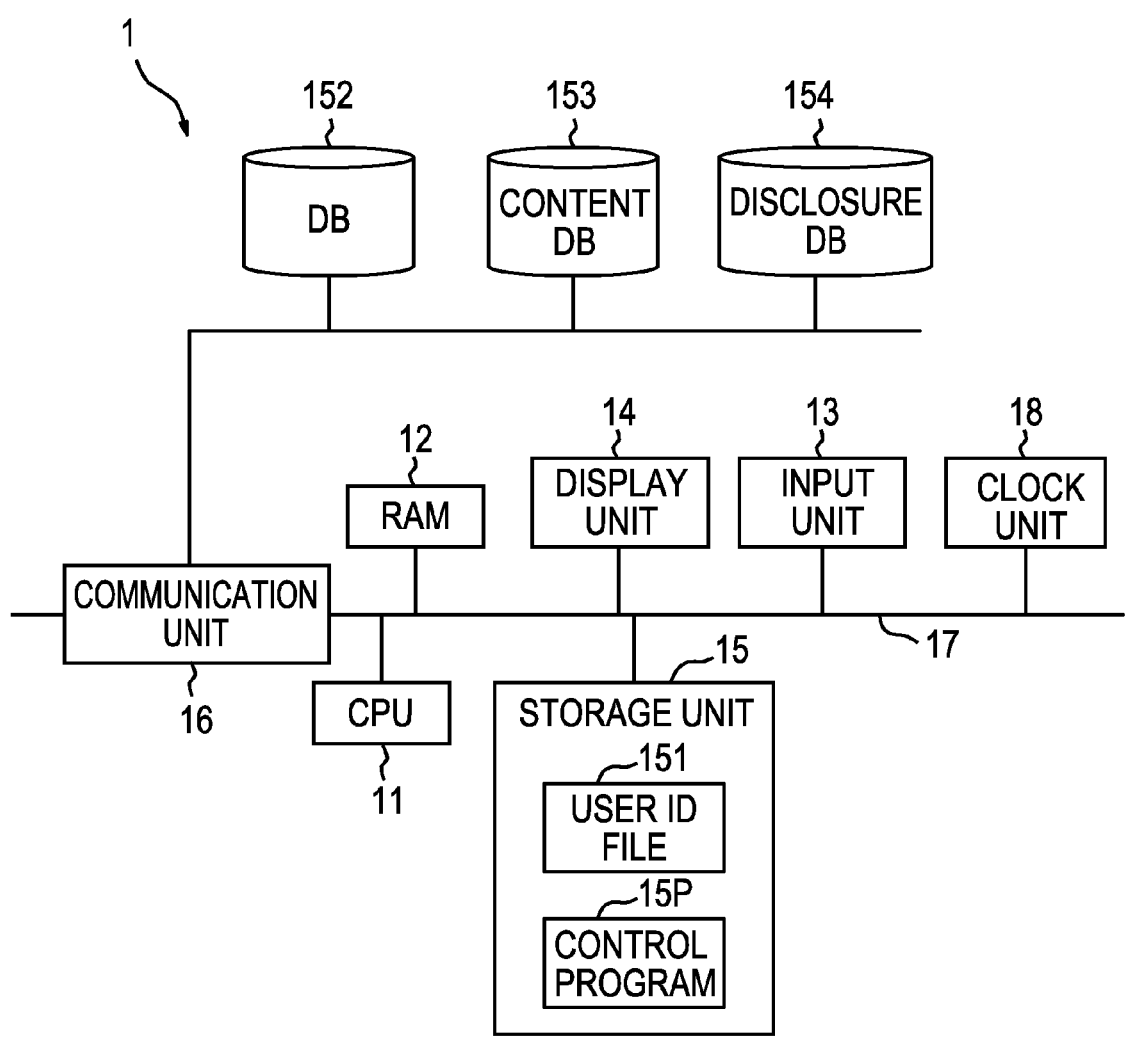
FIG. 5 illustrates a block diagram of a hardware configuration of a server computer.

FIG. 5 is a block diagram of a hardware configuration of the server computer 1. The server computer 1 includes a CPU 11 as a control unit, a RAM 12, a communication unit 16, an input unit 13, a display unit 14, a clock unit 18, a storage unit 15, and the like. The CPU 11 is connected to and controls each hardware element of the server computer 1 through a bus 17, and executes various software-like functions according to a control program 15P stored in the storage unit 15.

The communication unit 16 may be, for example, a gateway functioning as a firewall. The display unit 14 may be, for example, a liquid crystal display. The input unit 13 may be composed of, for example, a keyboard and a mouse. The clock unit 18 outputs date/time information to the CPU 11. The storage unit 25A may be, for example, a hard disk. Inside the storage unit 25A, a user ID file 151 is stored in addition to the above described control program 15P. The CPU 11 executes various processing according to the control program 15P. The server computer 1 may be connected to a DB 152, a content DB 153, a disclosure DB 154, and the like.

The CPU 11 interacts with the DBs using SQL (Structured Query Language) in a schema which associates keys of fields of the DB 152, content DB 153, and disclosure DB 154, thereby executing processing such as storage and retrieval of required information. Although in the present embodiment, the DB 152, the content DB 153, and the disclosure DB 154 are stored in the database server connected to the server computer 1, these DBs may be stored in the storage unit 15.

A user ID file 151 stores a user ID and a password of an SNS user. If a user ID and a password are sent to the CPU 11 through the communication unit 16, the CPU 11 determines whether or not the user ID and the password match the user ID and the password stored in the user ID file 151, and if they match, allows logging into the SNS. The user ID file 151 may also be stored in the DB server (not shown) instead of the storage unit 15.

FIG. 6 is an explanatory diagram of a record layout of the DB 152. The DB 152 includes an apparatus ID field, a user ID field, and a mail address field. In the apparatus ID field, an apparatus ID of apparatus 3 is stored. In the user ID field, a user ID is stored in association with an ID of an apparatus owned by each user. In the mail address field, a mail address is stored in association with a user ID. The mail address is sent to the server computer 1 at the time of initial registration of a user ID, a name, an interest, and the like for each user. The CPU 11 stores a mail address in association with a user ID in the DB 152. The apparatus ID can be registered at the time of initial registration as with the name, interest, and mail address.

When an ID of an apparatus owned by a user in association with a user ID or a mail address is sent to the server computer 1 through the communication unit 16, the server computer 1 stores the apparatus ID in association with the user ID or mail address in the DB 152. Alternatively, an apparatus ID may be stored in the DB 152 based on the apparatus ID, a mail address, and/or a user ID which were obtained during user registration at the time of purchase of the camera 3A. In the example of FIG. 6, an apparatus ID of the camera 3B owned by a user of user ID "U0003B" is "C3B".

FIG. 7 is an explanatory diagram of a record layout of the content DB 153. The content DB 153 stores, separately for each user ID, image data, an image ID, an apparatus ID, and the like with respect to each topic. An example of FIG. 7 illustrates a memory content about topic 1 for user ID "U003A" of a user having the camera 3A. The term "topic" refers to a page about a specific theme created in a community of an SNS. A creator of a topic can paste image data and write text in the topic. Then, other users can write text (comments) in the created topic. If disclosing of the topic in the community is restricted, the topic content can be viewed only by a specific user stored in the disclosure DB 154.

The content DB 153 includes an image ID field, an image data field, a text field, a photographing date/time field, an apparatus ID field, and a user ID field. In the image ID field, an image ID for identifying photographed image data is stored, and in the image data field, the image data associated with the relevant image ID is stored in JPEG (Joint Photographic Experts Group) format or the like. In the text field, text distributed together with image data from the personal computer 2A is stored. For example, a comment about a photograph may be stored in the text field.

In the photographing date/time field, a photographing date/time corresponding to the distributed image ID and image data is stored. In the apparatus ID field, an apparatus ID corresponding to the distributed image ID and image data are stored. Further, in the user ID field, a user ID corresponding to each apparatus ID is stored. When the server computer 1 accepts a topic generation from the personal computer 2A using user ID "U0003A", the server computer 1 sends an HTML document for topic generation stored in the storage unit 15 to the personal computer 2A. The personal computer 2A displays a screen for topic generation on the browser 251A. The user inputs a topic name ("topic 1" in this example"), image data, and text using the input unit 23A. The CPU 21A sends, together with the user ID, the topic name, image data, text, as well as the image ID, photographing date/time, and apparatus ID in Exif data of the image data to the server computer 1.

The CPU 11 of the server computer 1 creates a record of the topic 1 by referring to the received user ID as shown in FIG. 7. The CPU 11 stores the received image ID, image data, text, photographing date/time, and apparatus ID in association with the user ID and the topic generated by the user in the content DB 153. Further, the CPU 11 reads out the user ID corresponding to the stored apparatus ID by referring to the DB 152, and stores the read-out user ID in association with the apparatus ID.

FIG. 8 is an explanatory diagram of a record layout of the disclosure DB 154. The disclosure DB 154 as a target file stores, as a distribution target, a user ID to which a community of the SNS is to be disclosed. The disclosure DB 154 includes a user ID field and a distribution target field. In the user ID field, a user ID of a user who creates a community is stored. In the distribution target field, a user ID to whom a content is disclosed is stored in association with a user ID. In the example of FIG. 8, a user of user ID "U003A" having the camera 3A sets a community topic to be disclosed to two users whose user IDs are "U003B" and "U003D". If no user ID is stored in the distribution target field, it means that the community topic is disclosed to all. The manner of holding data as described above for the DB 152, the content DB 153, and the disclosure DB 154 is just one example, and data may be stored freely according to the design.

When if there is a request to view the topic 1 (image data) of user ID "U003A", the CPU 11 determines whether or not the received user ID exists in the record of the topic 1 of the content DB 153. If the received user ID exists in the record of the topic 1 of the content DB 153, the CPU 11 further searches the disclosure DB 154 to determine whether the received user ID is a distribution target or not. In the example of FIG. 7, image data and text in topic 1 of user ID "U003A" can be viewed from user IDs "U003B", "U003C" and "U0003D" existing in the communication zone if there is no restriction on disclosure. However, as shown in FIG. 8, user ID "U003C" is not set as a distribution target of user ID "U003A", and therefore the image data and text cannot be viewed by user ID "0003C" since there is a restriction on disclosure.

In the following example, it is assumed that there is restriction on disclosure, and users of user IDs "U003B" and "U003D" can view the image data and text. When users of user IDs "U003B" and "U003D" log in, the CPU 11 reads out image data, text, and a photographing date/time stored in the content DB 153, and sends the image data, text, and a photographing date/time to the personal computer 2B and 2D corresponding to user IDs "U003B" and "U003D" as HTML documents. In addition, the CPU 11 reads out guidance information stored in the storage unit 15 and sends the guidance information as an e-mail to a mail address stored in the DB 152. An e-mail including text such as "a new topic is uploaded", a URL of the server computer 1, a URL to access the topic 1 in which image data is placed, and the like in the body of the e-mail text is sent to the mail addresses of user IDs "U003B" and "U003D". The method for guidance information notification is not limited to this. For example, guidance information notification may be provided by RSS (Rich Site Summary) without distribution of an e-mail, or may be provided when a user logs in.

Figure 9:
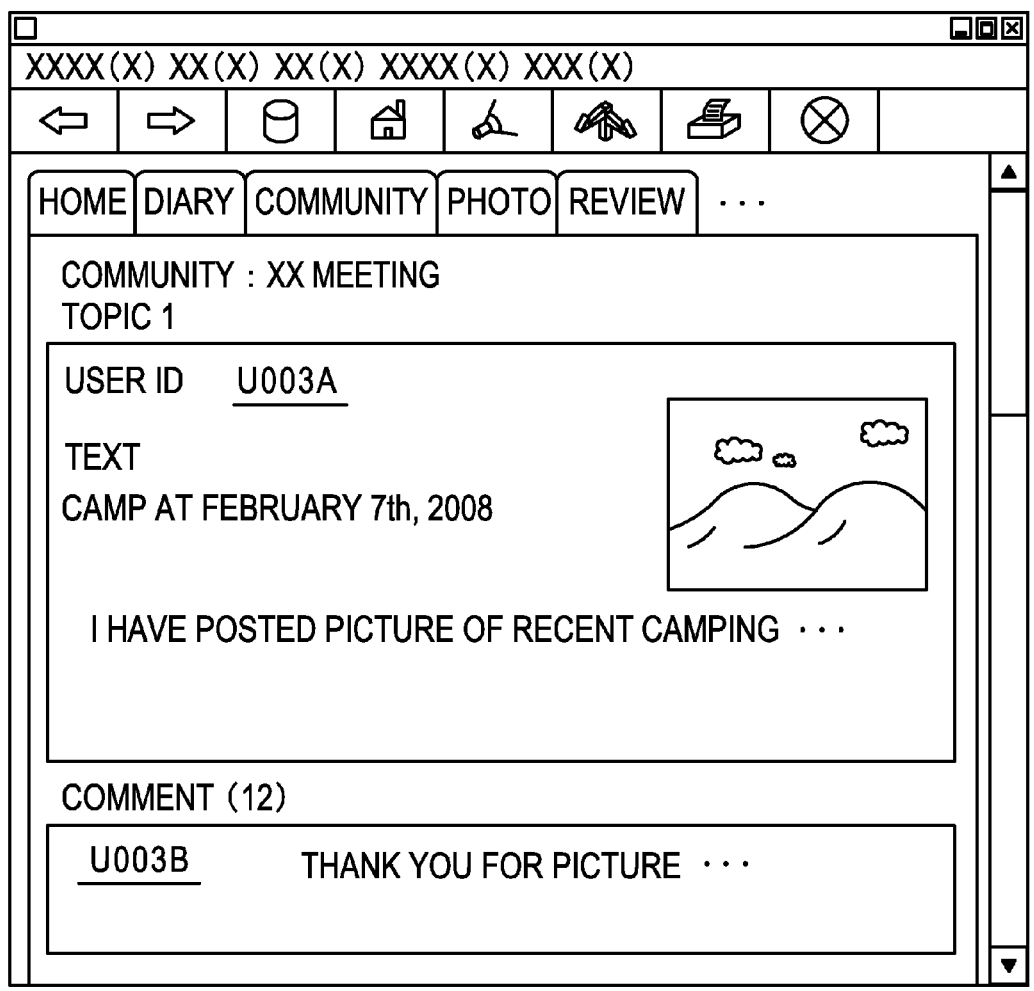
FIG. 9 illustrates an explanatory diagram of a display image of image data.

FIG. 9 is an explanatory diagram of a display image of image data. A screen shown in FIG. 9 is displayed in a browser of the personal computer 2B or 2D of the user of user ID "U003B" or "U003D". As shown in FIG. 9, text and image data of the topic 1 created by the user of ID "U003A" are displayed. Text as a comment can be sent to the server computer 1 from the personal computers 2B and/or 2D, which correspond to user IDs "U003B" and "U003D," through which the text and image data can be viewed. The server computer 1 stores text in association with the topic 1 in the content DB 153.

When the personal computer 2A, 2B, or 2D accesses the server computer 1 while sending the user IDs, the comment text is also sent in addition to the text and image data. In the example of FIG. 9, a comment of the user of user ID "U003B" is described. In this way, the user having the camera 3A remembers the users who accompanied him/her during photographing of the image and generates the topic 1, and so the user having the camera 3A can save the effort of separately registering the users to the SNS as disclosure targets. Further, due to the combination with the disclosure restriction function of the disclosure DB 154, communication with the users who accompanied the user at the time the user generated the content can be newly established while privacy is protected even if an unknown user exists in the communication zone.

Figure 10:
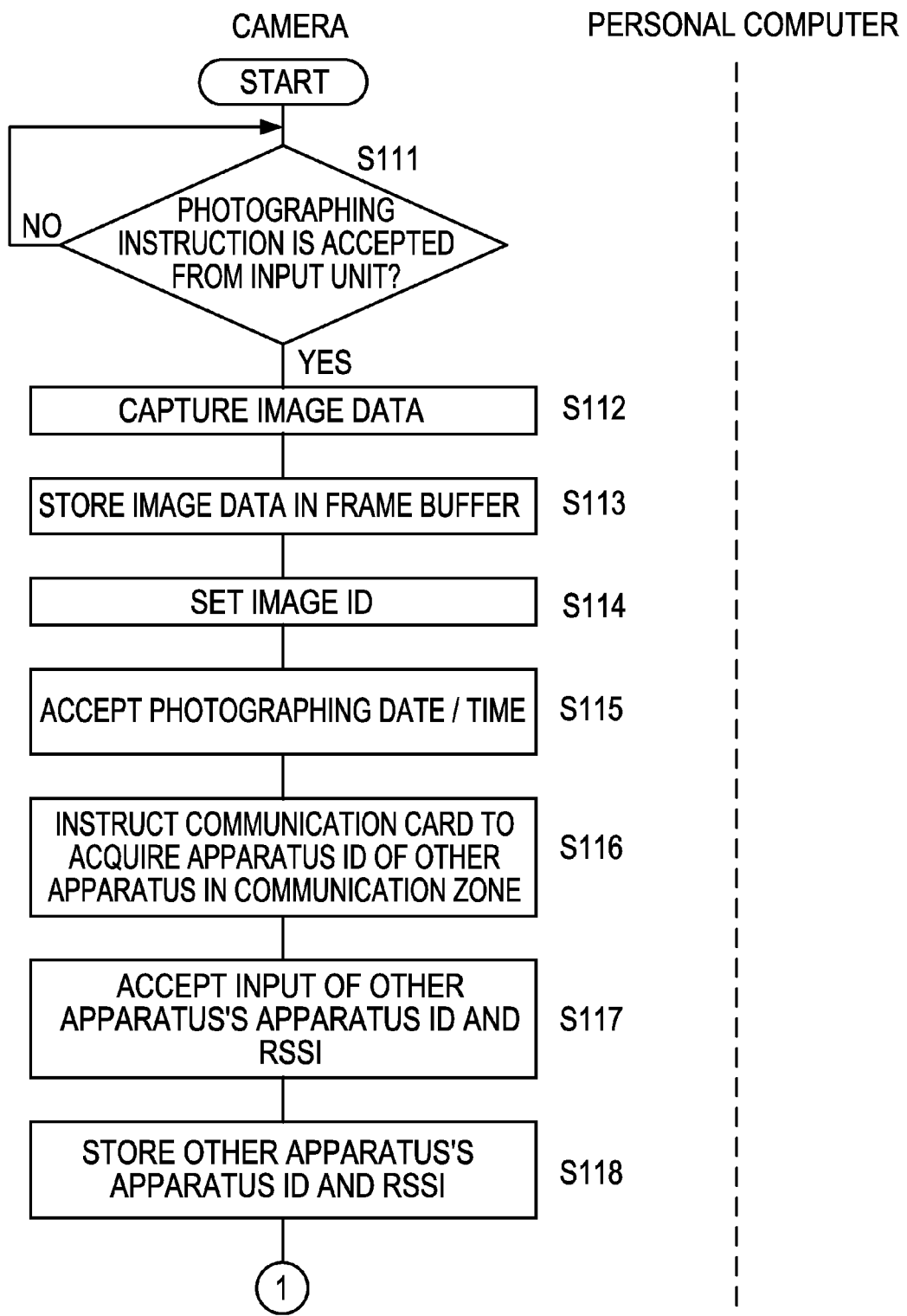
FIG. 10 illustrates a flowchart of a procedure of processing for detecting apparatus identification information of an apparatus.
Figure 11:
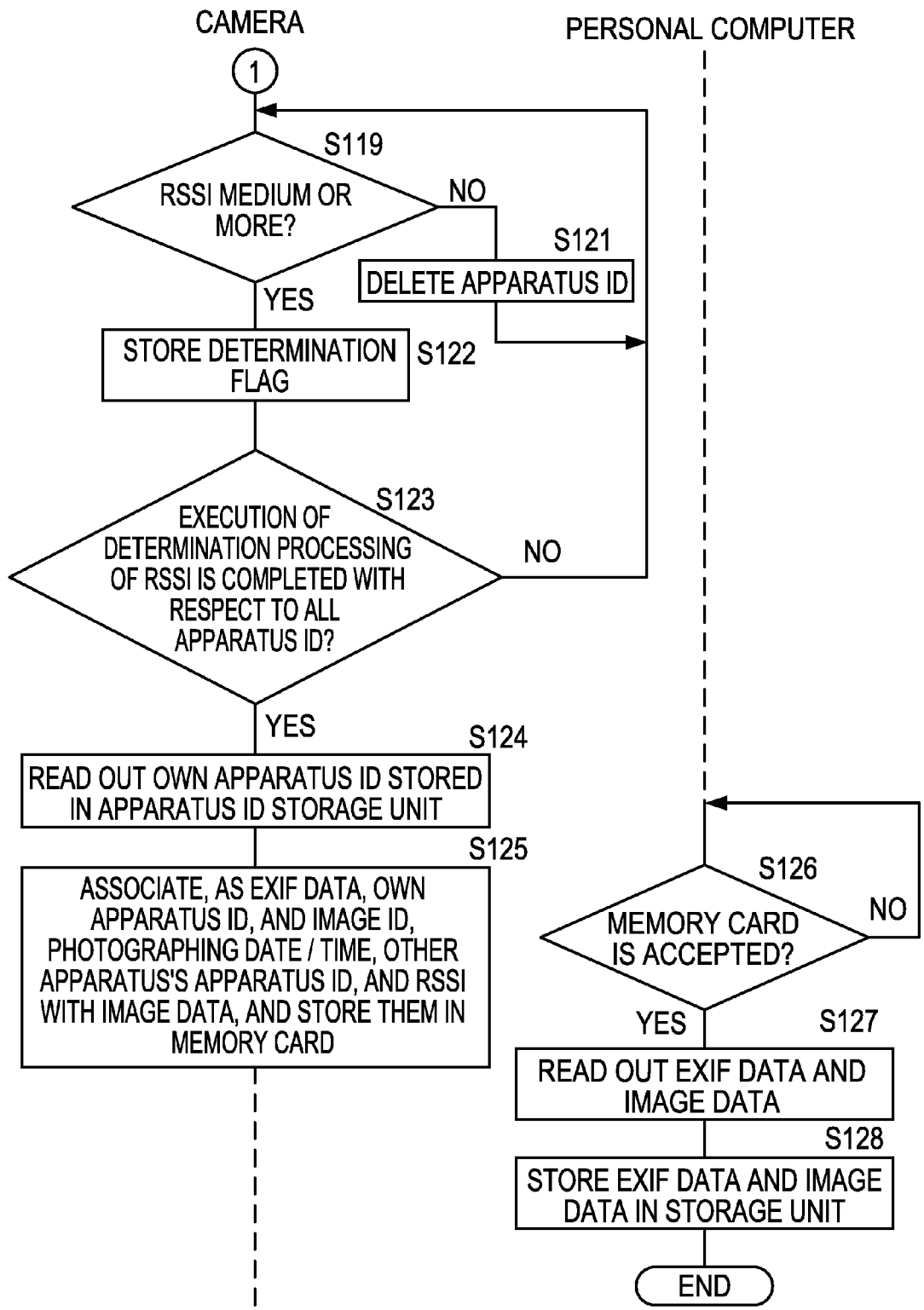
FIG. 11 illustrates a flowchart of a procedure of processing for detecting apparatus identification information of an apparatus.

Various software processes in the above described hardware configuration will be described using flowcharts. FIGS. 10 and 11 are flowcharts of procedures of processing for detecting an apparatus ID of an apparatus 3. The control unit 31A of the camera 3A executes the control program 32P and determines whether or not a photographing instruction is accepted from the input unit 33A (step S111). If a photographing instruction is not accepted (No in step S111), the control unit 31A repeats the above processing. On the other hand, if the control unit 31A determines that a photographing instruction is accepted from the input unit 33A (Yes in step S111), the control unit 31A captures image data through the CCD 38A (step S112). The control unit 31A stores the captured image data in the frame buffer 35A (step S113). The control unit 31A sets an image ID for identifying the image data stored in the frame buffer 35A (step S114), and stores the set image ID in the RAM 32A.

The control unit 31A accepts a photographing date/time outputted from the clock unit 39A (step S115). The control unit 31A stores the accepted photographing date/time in the RAM 32A. Then, the control unit 31A instructs the communication card 36A to acquire an apparatus ID of another apparatus 3 in the communication zone (step S116). The communication card 36A detects a communication card of the other apparatus 3 existing in the communication zone, and receives the apparatus ID of the other apparatus 3. The communication card 36A associates the apparatus ID with a RSSI of the apparatus ID and outputs them to the control unit 31A.

The control unit 31A accepts the input of the other apparatus's apparatus ID and the RSSI from the communication card 36A (step S117). The control unit 31A stores the RSSI in association with the other apparatus 3's apparatus ID in the RAM 32A (step S118). The control unit 31A determines whether or not the RSSI is medium or more (step S119). This threshold value "medium" for the RSSI is merely one example. The threshold of RSSI may be set optionally by a user through the input unit 33A, and in this case, the set threshold is stored in the RAM 32A and determination is made based on the set threshold.

When the control unit 31A determines that the RSSI of the apparatus ID of the other apparatus 3 is not medium or more (No in step S119), the control unit 31A deletes the apparatus ID of the other apparatus 3 from the RAM 32A (step S121). After that, the process returns to step S119. When the control unit 31A determines that the RSSI of the apparatus ID of the other apparatus 3 is medium or more (Yes in step S119), the control unit 31A stores a determination flag in association with the apparatus ID of the other apparatus 3 in the RAM 32A (step S122). The control unit 31A determines whether or not the completion of the determination processing of RSSIs in step S119 with respect to all apparatus IDs stored in the RAM 32A is completed by referring to the determination flags stored in the RAM 32A (step S123).

If the control unit 31A determines that the execution of the determination processing with respect to all the apparatus IDs has not been completed (No in step S123), the control unit 31A proceeds to step S119 to repeat the above processing. On the other hand, if the control unit 31A determines that the execution of the determination processing with respect to all the apparatus IDs has been completed (Yes in step S123), the control unit 31A reads out its own apparatus ID stored in the apparatus ID storage unit 361A (step S124). Then the control unit 31A associates, as Exif data, the read-out own apparatus ID, and the image ID, photographing date/time, other apparatus 3's apparatus ID, and the RSSI stored in the RAM 32A with the image data stored in the frame buffer 35A, and stores them in the memory card 351A (step S125).

After that, the user inserts the memory card 351A into the card slot 28A of the personal computer 2A to upload the image data. The CPU 21A of the personal computer 2A determines whether or not the memory card 351A is accepted (step S126). If the CPU 21A determines that the memory card 351A is not accepted (No in step S126), the personal computer 2A waits for the acceptance. On the other hand, if the CPU 21A determines that the memory card 351A is accepted (Yes in step S126), the CPU 21A reads out the image data and its Exif data stored in the memory card 351A (step S127). The CPU 21A stores the read-out image data and its Exif data in the storage unit 25A (step S128).

Figure 12:
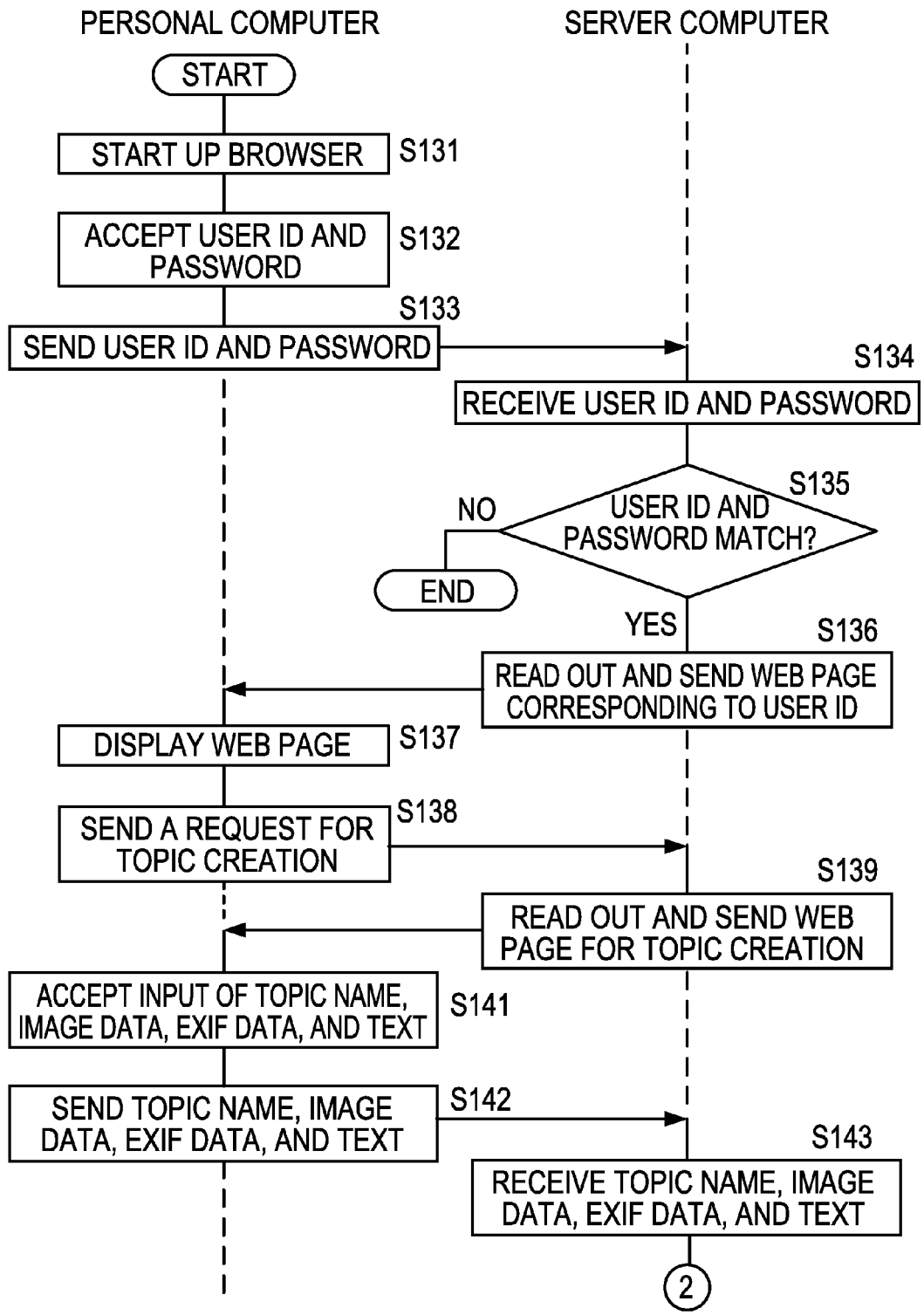
FIG. 12 illustrates a flowchart of a procedure of registration processing.
Figure 13:
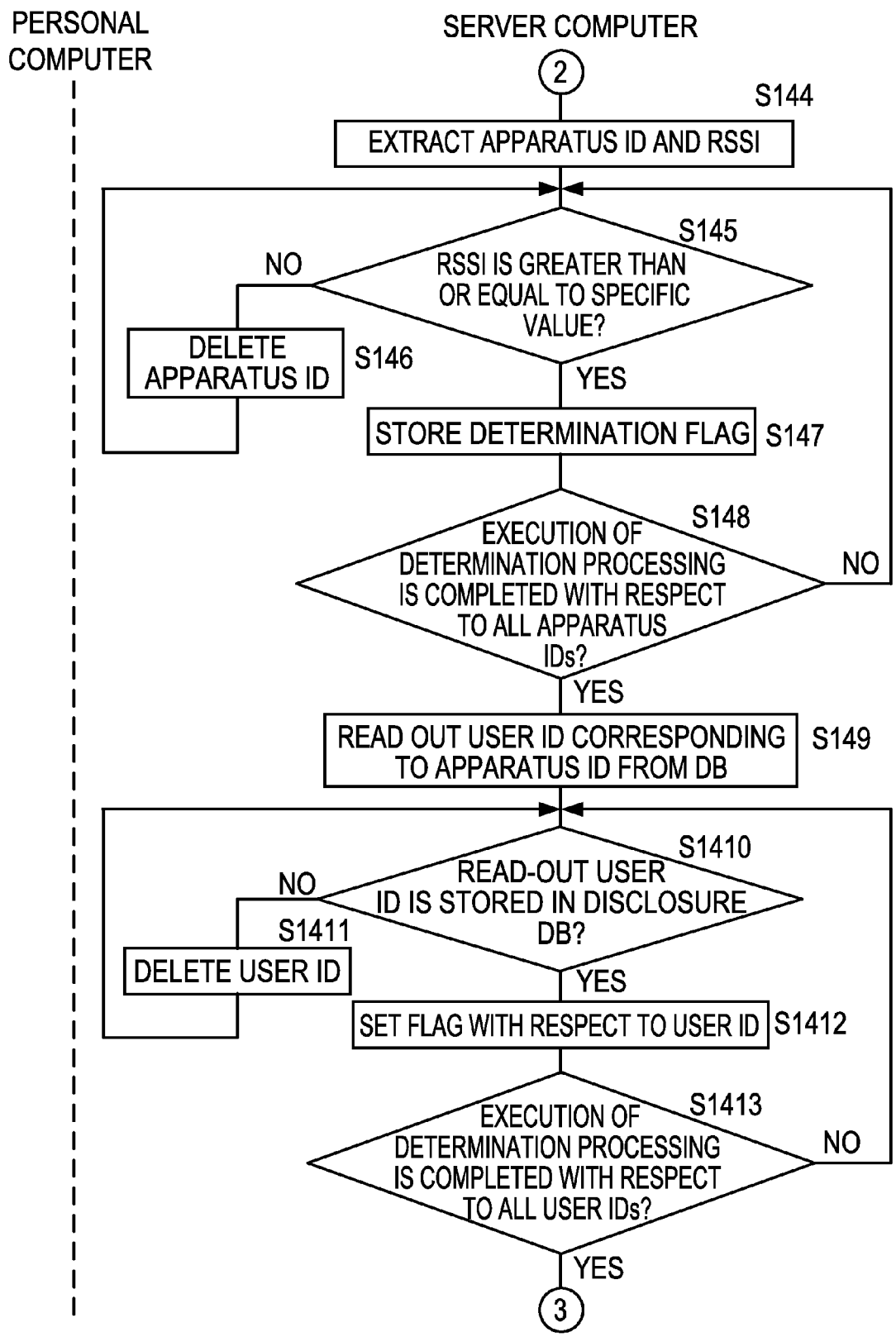
FIG. 13 illustrates a flowchart of a procedure of registration processing.
Figure 14:
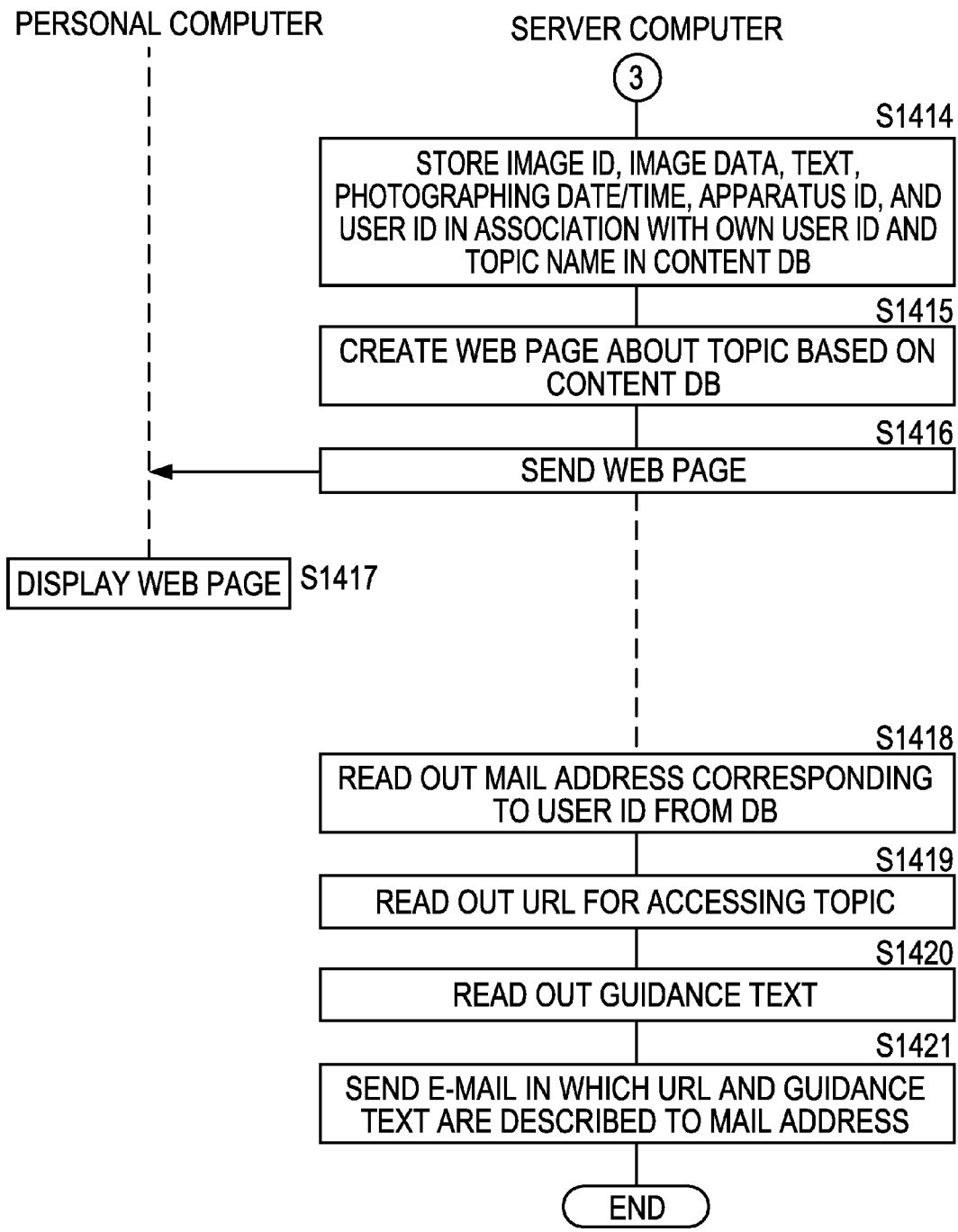
FIG. 14 illustrates a flowchart of a procedure of registration processing.

Next, registration processing of image data will be described. FIGS. 12 to 14 are flowcharts of procedures of the registration processing. The CPU 21A starts up the browser 251A based on an operation signal from the input unit 23A (step S131). A user who will send image data inputs a URL of the server computer 1 and an ID and a password through the input unit 23A. The CPU 21A accepts the URL as well as the ID and password (step S132). The CPU 21A sends the ID and password accepted through the input unit 23A to the server computer 1 (step S133).

The CPU 11 of the server computer 1 receives the ID and password through the communication unit 16 (step S134). The CPU 11 determines whether or not the received user ID and password match the user ID and password stored in the user ID file 151 by referring to the user ID file 151 (step S135). If the CPU 11 determines that the received user ID and password do not match the user ID and password stored in the user ID file 151 (No in step S135), the CPU 11 considers the access as an unauthorized access and terminates the process. On the other hand, if the CPU 11 determines that the received user ID and password match (Yes in step S135), the CPU 11 reads out a web page corresponding to the user ID by referring to the content DB 153 and sends the read-out web page to the personal computer 2A (step S136). This web page may be, for example, a home page of the SNS for this user.

The browser 251A of the personal computer 2A displays the received web page on the display unit 24A (step S137). Then, the user creates a topic about the photographed image data to post the image data thereon. The CPU 21A detects whether or not a hyperlink, for example, "create a topic" in the web page is operated through the input unit 23A. When the operation is detected, the CPU 21A sends a request for topic creation to the server computer 1 (step S138). When the CPU 11 of the server computer 1 receives the request for creation, the CPU 11 reads out a web page which is a prototype for creating the topic from the storage unit 15, and sends the read-out web page to the personal computer 2A (step S139).

The CPU 21A accepts a topic name and text inputted from the input unit 23A and image data and its Exif data read out from the memory card 351A (step S141). Specifically, the user inputs the topic name in a topic name field displayed in the browser 251A and text, such as a comment in a text box field, through the input unit 23A. In addition, the user inputs the image data stored in the memory card 351A as image data to be attached to the web page.

The CPU 21A sends the accepted topic name, image data, Exif data, and text to the server computer 1 (step S142). The CPU 11 of the server computer 1 receives the topic name, image data, Exif data, and text (step S143). The CPU 11 extracts an apparatus ID and a RSSI about another apparatus 3 by referring to the Exif data (step S144). The CPU 11 stores the extracted apparatus ID and RSSI in the RAM 12. In the present embodiment, a configuration is described in which determination based on RSSI is also made in the server computer 1. The CPU 11 determines whether or not the read-out RSSI is greater than or equal to a specific value (e.g., strong) prestored in the storage unit 15 (step S145). This specific value can be set to any suitable value by an operator through the input unit 13. Further, a user may be allowed to change this specific value when the user logs into the server computer 1.

If the CPU 11 determines that the RSSI is not greater than or equal to the specific value (No in step S145), the CPU 11 deletes the apparatus ID stored in the RAM 12 (step S146). Then, the process returns to step S145 again. If the CPU 11 determines that the RSSI is greater than or equal to the specific value (Yes in step S145), the CPU 11 stores a determination flag in association with the stored apparatus ID in the RAM 12 (step S147). The CPU 11 determines whether or not the execution of the determination processing in step S145 with respect to all apparatus IDs stored in the RAM 12 is completed by referring to the determination flags stored in the RAM 12 (step S148). If the CPU 11 determines that the execution of the determination processing with respect to all the apparatus IDs is not completed (No in step S148), the process returns to step S145.

On the other hand, if the CPU 11 determines that the execution of the processing with respect to all the apparatus IDs is completed (Yes in step S148), the CPU 11 reads out a user ID corresponding to the apparatus ID by referring to the DB 152 (step S149). The CPU 11 determines whether or not the user ID read out in step S149 is stored in the disclosure DB 154 by referring to the user ID received in step S134 and the disclosure DB 154 (step S1410). If the read-out user ID is not stored in the disclosure DB 154 (No in step S1410), the CPU 11 deletes the user ID (step S1411) because the user corresponding to the user ID is not allowed to view the image data. After that, the process returns to step S1410.

On the other hand, if the CPU 11 determines that the read-out user ID is stored in the disclosure DB 154 (Yes in step S1410), the CPU 11 sets a flag with respect to the user ID (step S1412). Then, the CPU 11 determines whether or not the execution of determination processing in step S1410 with respect to all user Ids is completed by referring to the flags set with respect to the user IDs (step S1413). If the CPU 11 determines that the execution of the processing with respect to all the user Ids is not completed (No in step S1413), the process returns to step S1410. On the other hand, if the CPU 11 determines that the execution of the processing with respect to all the user IDs is completed (Yes in step S1413), the CPU 11 stores image ID, image data, text, photographing date/time, apparatus ID, and a user ID of a user to which image data is disclosed in association with the own user ID and topic name in the content DB 153 (step S1414). In the above described example, a user ID having "strong" RSSI and stored in the disclosure DB 154 is only "U003B" of apparatus ID "C3B".

The CPU 11 creates a web page about the topic based on the content DB 153 shown in FIG. 7 (step S1415). The CPU 11 reads out the created web page, and sends the read-out web page to the personal computer 2A (step S1416). The CPU 21A of the personal computer 2A displays the received web page on the browser 251A (step S1417). After sending the image data, the user logs out from the SNS. Further, the server computer 1 performs processing to send information through an e-mail that the topic is created to the target to which image data is disclosed, that is, that the image data is stored on the server computer 1. The CPU 11 reads out a mail address corresponding to the user ID stored in step S1414 from the DB 152 (step S1418).

The CPU 11 reads out a URL for accessing the web page of the topic created in step S1415 from the storage unit 15 (step S1419). Further, the CPU 11 reads out guidance text from the storage unit 15 indicating that the topic is created (step S1420). This guidance text may be, for example, text which says "A topic is created. The URL is here . . . " The CPU 11 sends an e-mail in which the guidance text read out in step S1420 and the URL read out in step S1419 are described to the mail address read out in step S1418 (step S1421). In this way, the target user knows that the image data during the camping is uploaded.

Figure 15:
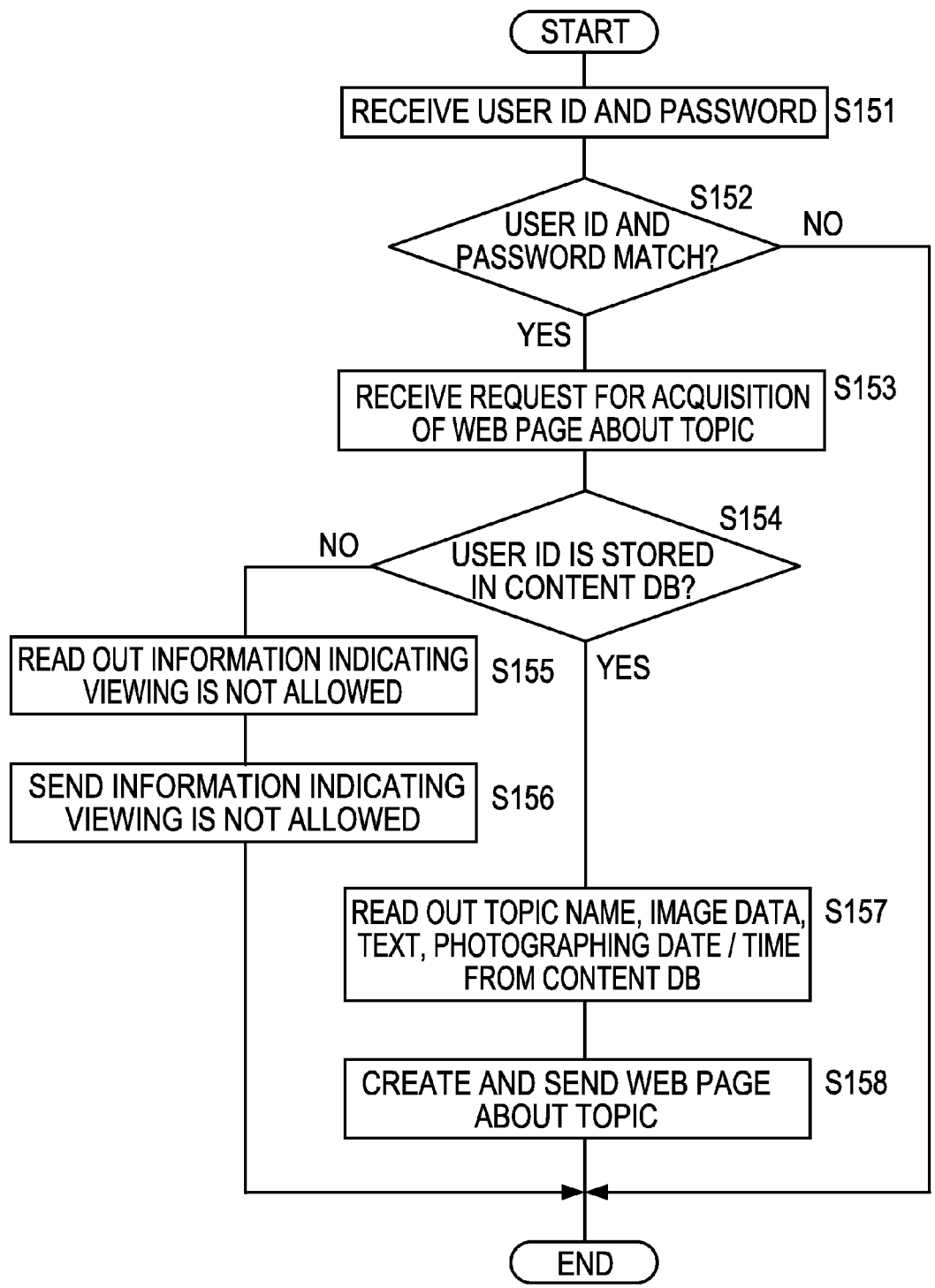
FIG. 15 illustrates a flowchart of a procedure for permitting another user to view a content.

FIG. 15 is a flowchart of a procedure for permitting another user to view a content. Processing for the personal computer 2B and the server computer 1 to receive information relating to users who want to view will be described below. The CPU 11 receives a user ID and a password sent from the personal computer 2B (step S151). The CPU 11 determines whether or not the received user ID and password match the user ID and password stored in the user ID file 151 by referring to the user ID file 151 (step S152). If the CPU 11 determines that the received user ID and password do not match the user ID and password stored in the user ID file 151 (No in step S152), the CPU 11 considers the access as an unauthorized access and terminates the process. On the other hand, if the CPU 11 determines that the received user ID and password match the user ID and password stored in the user ID file 151 (Yes in step S152), the CPU 11 reads out a web page corresponding to the user ID by referring to the content DB 153 and sends the read-out web page to the personal computer 2B. This web page may be, for example, a home page of the SNS for a user who desires viewing. Thus, the login is completed.

The user who desires viewing browses inside the SNS and then views the home page of the user who sent the image data in the SNS. Then, the user who desires viewing clicks a hyperlink to the newly updated topic. The personal computer 2B sends a request for acquisition of the web page about the topic to the server computer 1. The CPU 11 receives the request for acquisition of the web page about the topic (step S153). The CPU 11 determines whether or not an ID of a user currently logging in is stored in association with the desirable topic in the content DB 153 (step S154). The processing of step S154 may be triggered by clicking on the hyperlink to the topic described in the e-mail sent in step S1421. In this case, the URL related to the topic is sent from the personal computer 2B to the server computer 1.

The server computer 1 requests the personal computer 2B to send a user ID and a password. The CPU 11 of the server computer 1 executes the processing of step S154 after the authentication described in steps S151 and S152. If the CPU 11 determines that the user ID is not stored in the content DB 153 (No in step S154), the CPU 11 reads out information from the storage unit 15 indicating viewing is not allowed (step S155). This information is, for example, text such as "This topic is set as private and cannot be viewed." The CPU 11 sends this information indicating viewing is not allowed to the personal computer 2B (step S156).

On the other hand, If the CPU 11 determines that the user ID is stored in the content DB 153 (Yes in step S154), the CPU 11 reads out the topic name, image data, text, photographing date/time from the content DB 153 to allow the viewing (step S157). Then, the CPU 11 creates a web page related to the topic including at least the image data based on the read-out information, and sends the crated web page to the personal computer 2B (step S158).

Figure 16:
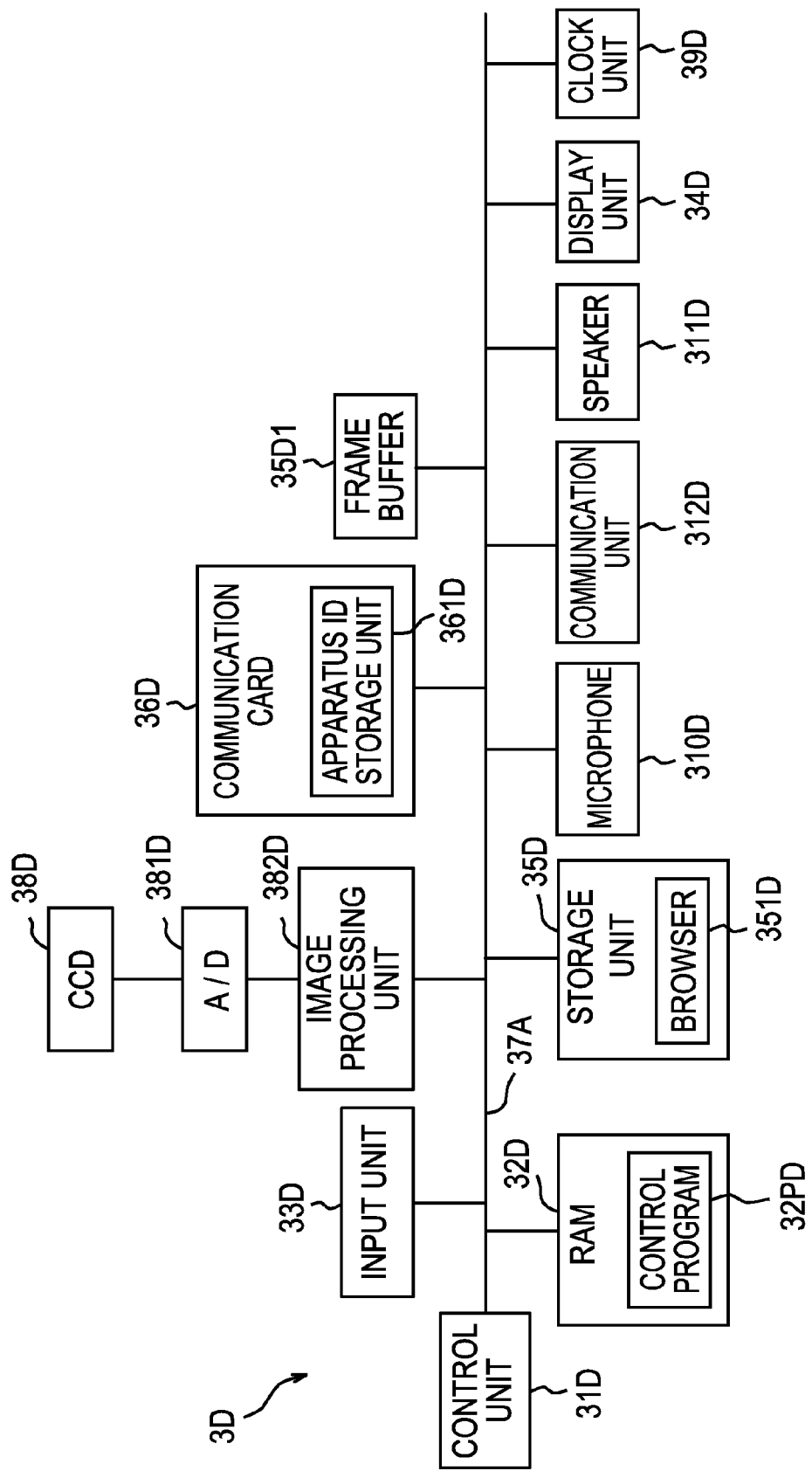
FIG. 16 illustrates a block diagram of a hardware configuration of a mobile telephone.

Although in the present embodiment, the camera 3 detects an apparatus ID and the personal computer 2 sends the apparatus ID and image data to the server computer 1, a similar function to the embodiment may be implemented by, for example, the mobile telephone 3D having a communication function and a photographing function. FIG. 16 is a block diagram of a hardware configuration of the mobile telephone 3D. The mobile telephone 3D includes a control unit 31D, a RAM 32D, an input unit 33D, a display unit 34D, a clock unit 39D, a communication unit 312D, a microphone 310D, a speaker 311D, a frame buffer 35D1, a communication card 36D, a CCD 38D, an A/D 381D, and a storage unit 35D. The control unit 31D is connected to and controls each part of the hardware of the mobile telephone 3D through a bus 37D, and executes various software-like functions according to a control program 32PD stored in the RAM 32D.

Description overlapping with the camera 3A will be omitted as appropriate. The speaker 311D amplifies and outputs call data or an audio signal of speech inputted from the microphone 310D. The microphone 310D converts an audio signal inputted from outside to an electrical signal. The converted electrical signal is converted to digital data by an A/D converter (not shown) and outputted to the control unit 31D. The communication unit 312D has a high-frequency transceiver unit, an antenna, and the like, and sends and receives various data including image data. The control unit 31D stores, in the storage unit 35D, an apparatus ID and a RSSI detected by the communication card 36D in association with image data captured through the CCD 38D as in the camera 3A.

Further, the control unit 31D stores, in the storage unit 35D, a photographing date/time outputted from the clock unit 39D and an apparatus ID of the mobile telephone 3D stored in the apparatus ID storage unit 361D. The control unit 31D associates, as Exif data, the stored another apparatus 3's apparatus ID, an own apparatus ID, and photographing date/time with the image data and stores them. The control unit 31D starts up a browser 351D and accesses the server computer 1. The control unit 31D sends an ID and a password inputted from the input unit 33D to the server computer 1 and thereby logs into the SNS. The control unit 31D accepts a topic name and text inputted through the input unit 33D. Then, the control unit 31D sends the topic name, text, image data, and Exif data to the server computer 1. Processing from then on is the same as previously described, and detailed description thereof is omitted.

Embodiment 2

Figure 17:
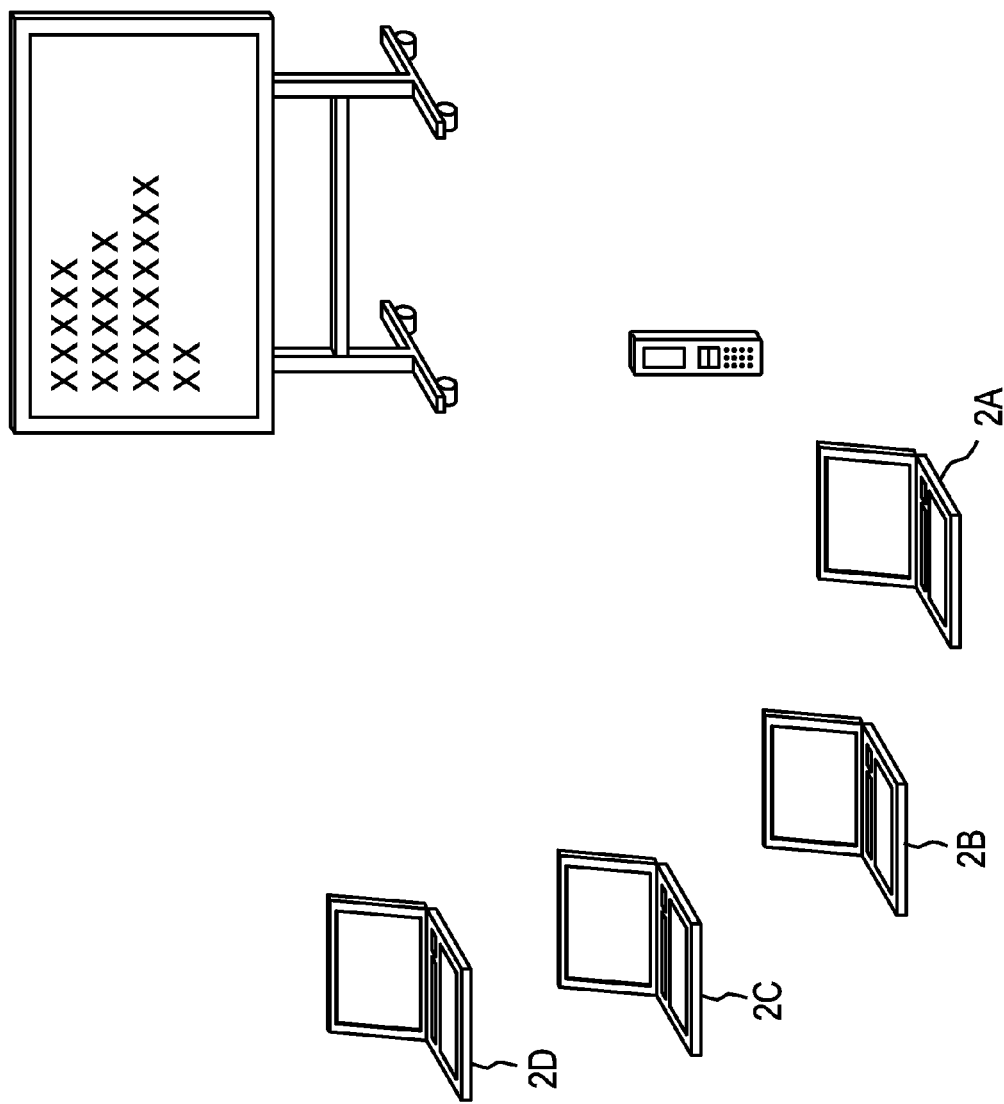
FIG. 17 illustrates a schematic diagram of a content distribution system according to embodiment 2.

In embodiment 2, the system of the present invention is applied to a meeting. FIG. 17 is a schematic diagram of a content distribution system according to embodiment 2. Information processors 2A, 2B, 2C, 2D (represented as 2 in some cases) in place of an apparatus 3 described in embodiment 1 create a content and send the content together with an apparatus ID to the server computer 1. In the following description, it is assumed that the information processor 2 is the personal computer 2 and a content to be created is a meeting proceedings created by a document creation application. Further, in the following example, it is assumed that users of the personal computers 2A to 2C are participating in a meeting, and a user of the personal computer 2D temporarily participates in the middle of the meeting and leaves the meeting before it is over. In addition, the creation of the proceedings and the collection of the apparatus IDs are performed by the personal computer 2A in the example.

Figure 18:
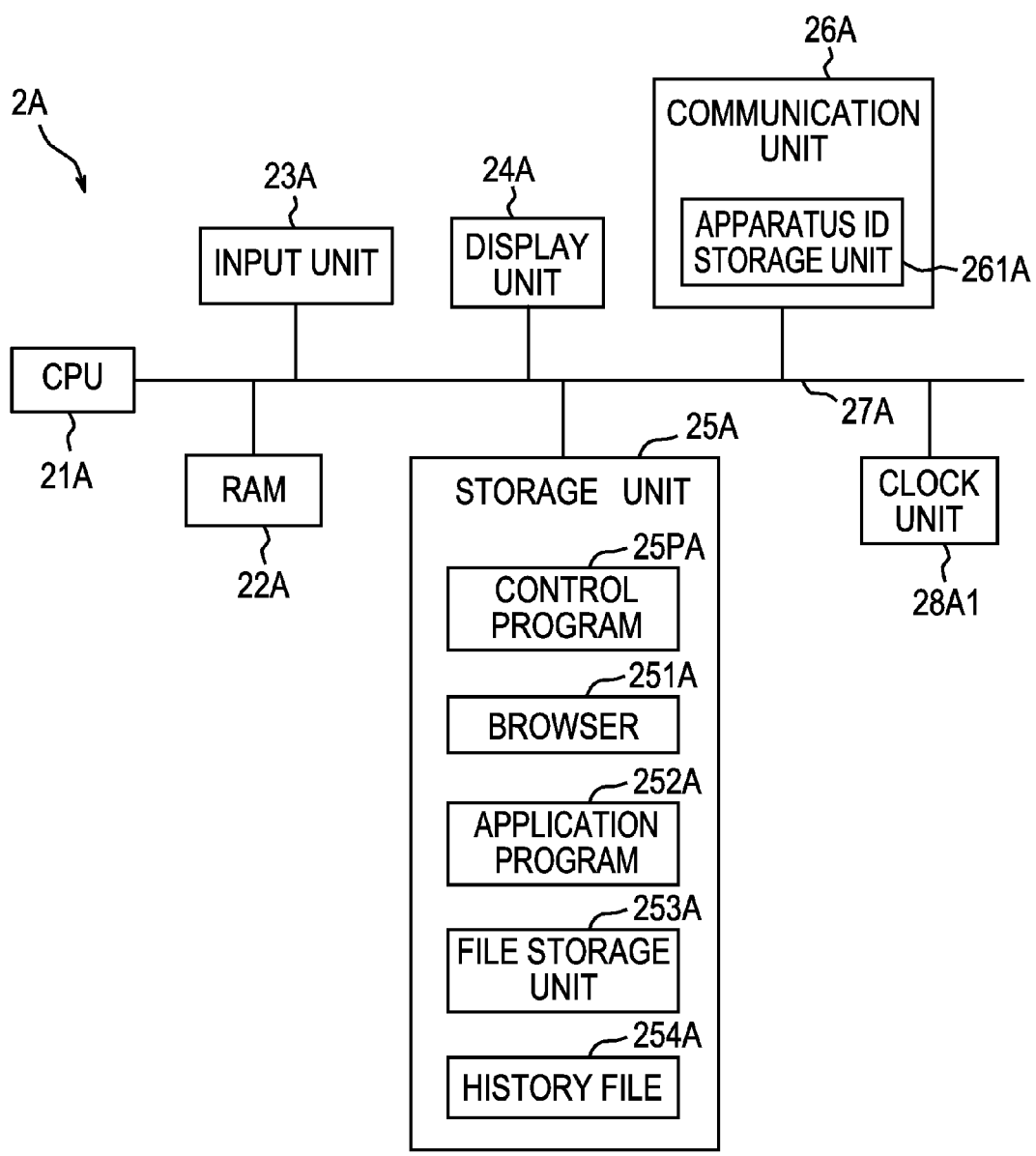
FIG. 18 illustrates an explanatory diagram of a hardware configuration of a personal computer according to embodiment 2.

FIG. 18 is an explanatory diagram of a hardware configuration of the personal computer 2A according to embodiment 2. The personal computers 2B to 2D also have similar configurations. In addition to the configuration of embodiment 1, an application program 252A, a file storage unit 253A, and a history file 254A are newly provided in the storage unit 25A, and a clock unit 28A1 and an apparatus ID storage unit 261A of a communication unit 26A are further provided in embodiment 2. The clock unit 28A1 outputs date/time information to the CPU 21A. The communication unit 26A may be, for example, a wireless LAN card, and an apparatus ID for identifying the wireless LAN card is stored therein. The communication unit 26A detects apparatus IDs stored in communication units of other personal computers 2B to 2D existing in a communication zone. In addition, the communication unit 26A may send and receive information to and from the server computer 1 described in embodiment 1 using, for example, HTTP.

The application program may be, for example, Microsoft Word®, Excel®, or PowerPoint®. In this example, the proceedings are created using Word. The file storage unit 253A stores a file such as the proceedings created by the application program 252A. The history file 254A stores a file name of a created file, an apparatus ID, and a date/time of detection of the apparatus ID.

FIG. 19 is an explanatory diagram of a record layout of the history file 254A. The history file 254A includes a file name field, a creation start date/time field, a creation end date/time field, an apparatus ID field, and a detection date/time field. In the file name field, a file name "February 10th proceedings" of the proceedings created by the application program 252A is stored. Although the file name is shown for ease of explanation, a path name of the proceedings stored in the file storage unit 253A may be stored. In the creation start date/time field, information of a date/time at which the application program 252A starts creation of proceedings is stored in association with a file name. In the creation end date/time field, information of a date/time at which the application program 252A ends creation of proceedings is stored.

In the apparatus ID field, an apparatus ID of a neighboring personal computer 2 which is included in a communication zone of the personal computer 2A between a creation start date/time and a creation end date/time is stored in association with a file name. Further, in the detection date/time field, information of a date/time of detection of an apparatus ID is stored in association with the apparatus ID based on date/time information outputted from the clock unit 28A1. In this example, at a creation start date/time of proceedings, February 10th, 10:00, the personal computers 2B and 2C of apparatus IDs "PC02B" and "PC02C" were detected. The CPU 21A detects an apparatus ID in the communication zone periodically, e.g., at 10 second intervals, and stores the detected apparatus ID and detection date/time. For example, also after 10 seconds, at 10:00:10, the personal computers 2B and 2C of apparatus IDs "PC02B" and "PC02C" were detected. Further, 10 minutes after that, at 10:10, apparatus ID "PC02D" of the personal computer 2D which participated in the middle of the meeting was detected. At a creation end time, 10:30, the personal computers 2B and 2C of apparatus IDs "PC02B" and "PC02C" were detected. Because apparatus ID "PC02D" is not detected at the creation end time, it may be determined that the user of the personal computer 2D left the meeting in the middle.

When the application program 252A is started up, the CPU 21A of the personal computer 2A stores a creation start date/time in the creation start date/time field. The CPU 21A also instructs the communication unit 26A to detect an apparatus ID. The detected apparatus ID is stored in association with the detection date/time in the apparatus ID field according to an instruction of the CPU 21A. The CPU 21A gives an apparatus ID detection instruction to the communication unit 26A periodically, e.g., at 10 second intervals. When a new apparatus ID is detected, the CPU 21A stores a detected apparatus ID, and stores a date/time outputted from the clock unit 28A1 as a detection date/time in the history file 254A. Further, when the CPU 21A accepts an end command from the application program 252A, the CPU 21A again stores a date/time outputted from the clock unit 28A1 as a creation end date/time in the creation end date/time field. In addition, the CPU 21A requests the communication unit 26A to detect an apparatus ID. The detected apparatus ID is stored in association with the creation end date/time in the apparatus ID field according to an instruction of the CPU 21A.

Figure 20:
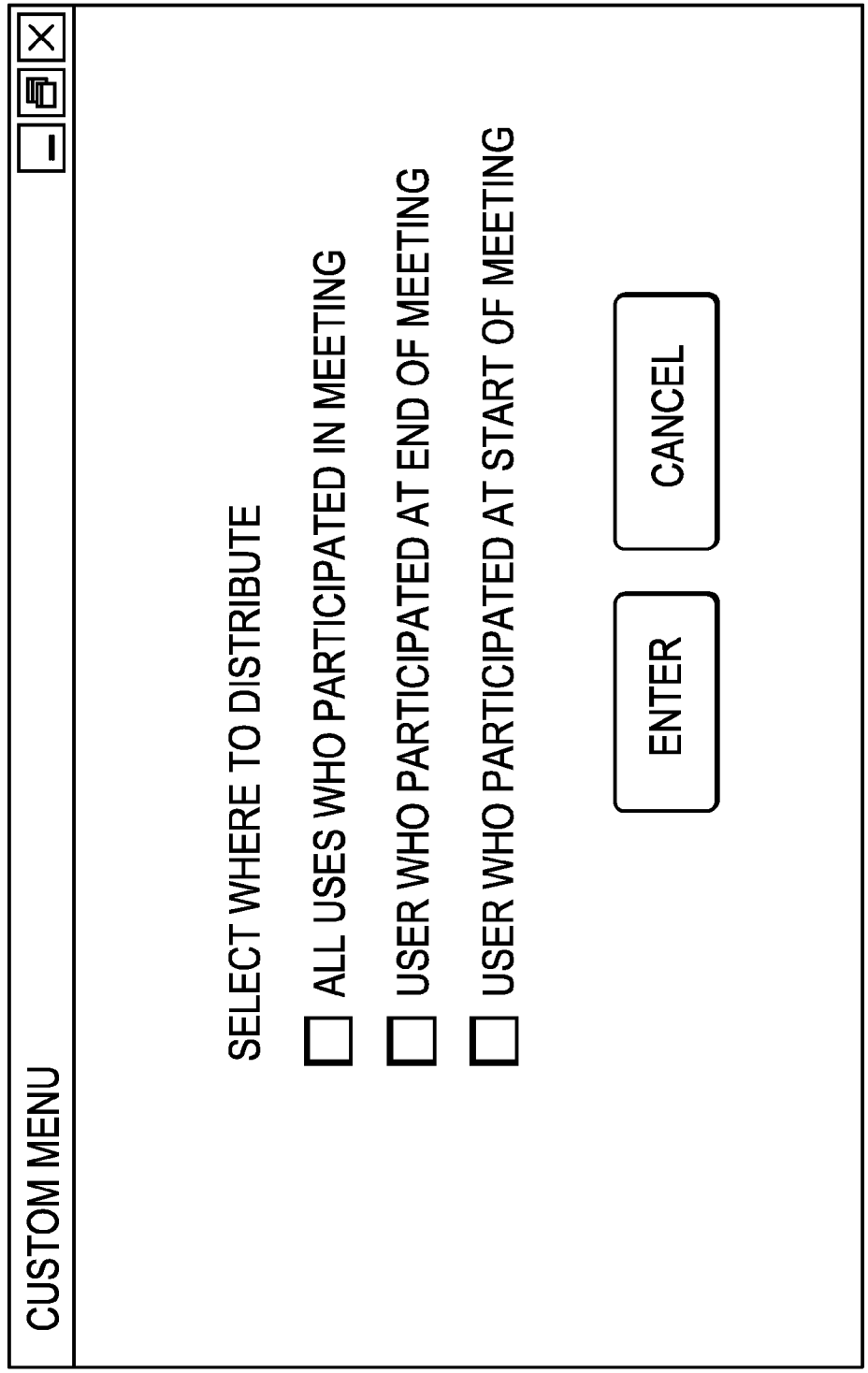
FIG. 20 illustrates an explanatory diagram of a screen image for selecting a distribution destination of proceedings.

FIG. 20 is an explanatory diagram of a screen image for selecting a distribution destination of the proceedings. The CPU 21A displays a custom menu screen stored in the storage unit 25A on the display unit 24A as shown in FIG. 20. On the custom menu screen, three choices are displayed. A user clicks a check box illustrated as a hollow square to select one of the three choices displayed on the custom menu screen. When one choice "all users who participated in the meeting" is selected, the CPU 21A extracts all of the apparatus IDs detected between the creation start date/time and the creation end date/time of the proceedings from the history file 254A. In the example of FIG. 19, apparatus IDs "PC02B", "PC02C", and "PC02D" are extracted.

When "user who participated at the end of the meeting" is selected, the CPU 21A extracts an apparatus ID stored in association with the creation end date/time. The purpose of this is to exclude a user who only temporarily participated in the meeting and the like. In the example of FIG. 19, apparatus IDs "PC02B" and "PC02C" are extracted. When "user who participated at the start of the meeting" is selected, the CPU 21A extracts an apparatus ID stored in association with the creation start date/time. The purpose of this is to exclude a user who was late for the meeting and the like.

In the example of FIG. 19, apparatus IDs "PC02B" and "PC02C" are extracted. The apparatus ID "PC02D" of a user late for the meeting is not extracted. The CPU 21A stores an item selected in the custom menu screen in the storage unit 25A. As described in embodiment 1, the CPU 21A logs into the server computer 1 and then sends the topic name, text, file about proceedings, creation start date/time, creation end date/time, and apparatus ID to the server computer 1.

Figure 21:
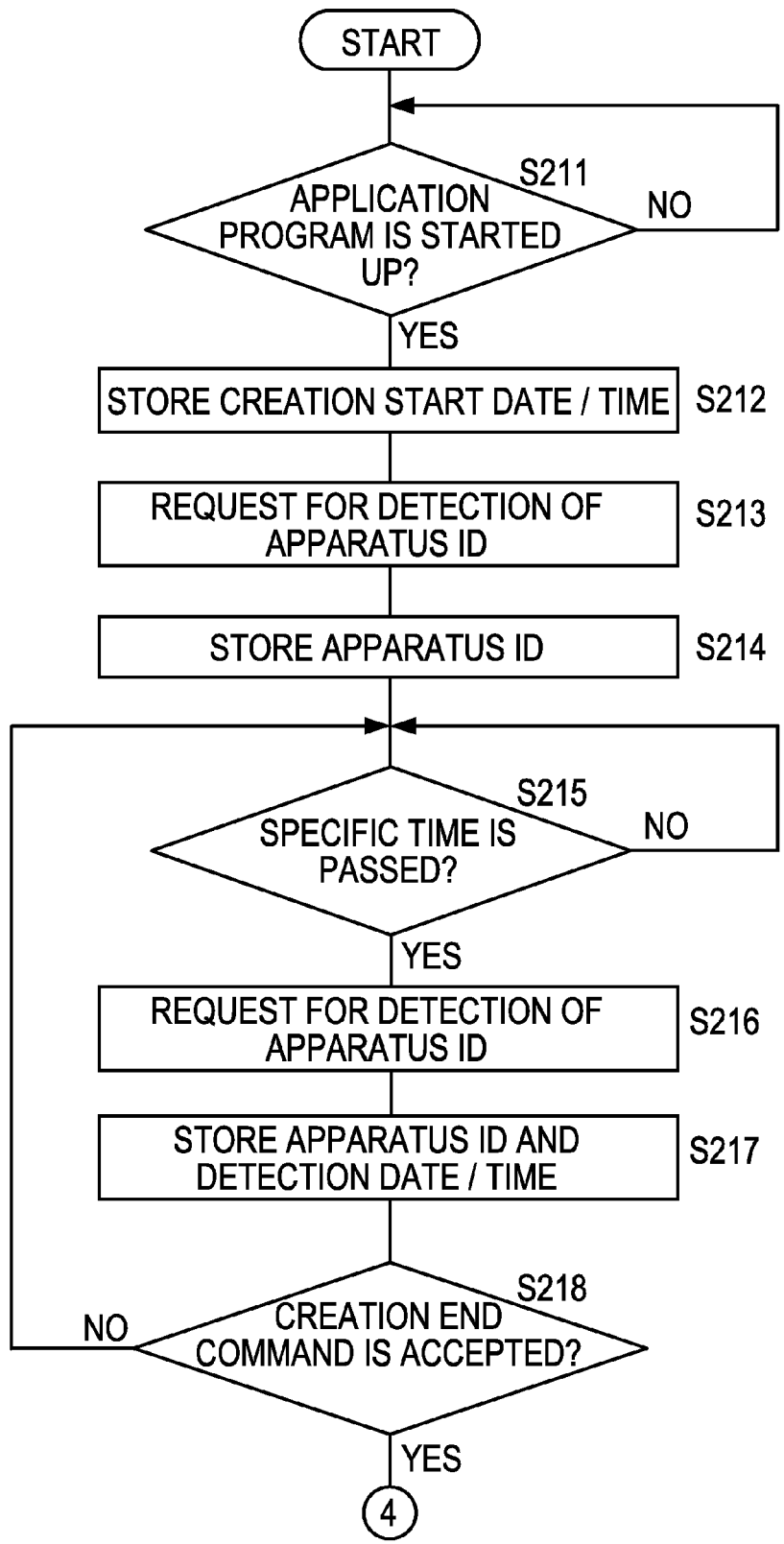
FIG. 21 illustrates a flowchart of a procedure of processing for detecting an apparatus ID.
Figure 22:
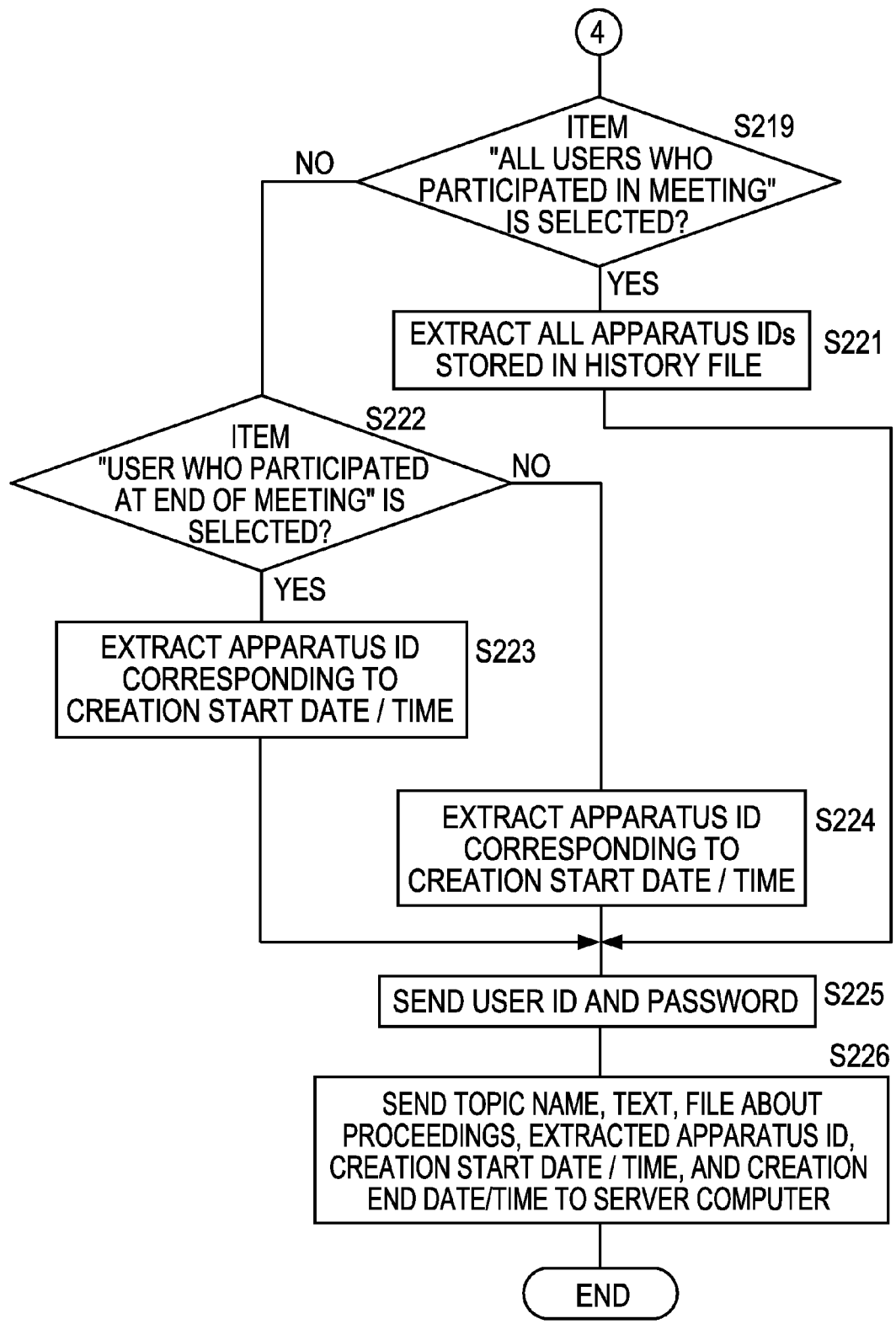
FIG. 22 illustrates a flowchart of a procedure of processing for detecting an apparatus ID.

FIGS. 21 and 22 are flowcharts of procedures of processing for detecting an apparatus ID. The CPU 21A determines whether or not the target application program 252A which will create the proceedings is started up (step S211). If the CPU 21A determines that the target application program 252A which will create proceedings is not started up (No in step S211), the CPU 21A waits for the startup of the target application program 252A. On the other hand, if the CPU 21A determines that the application program 252A is started up (Yes in step S211), references date/time information outputted from the clock unit 28A1, and stores the creation start date/time in the history file 254A (step S212). In conjunction with this, the CPU 21A requests the communication unit 26A to detect an apparatus ID (step S213).

The communication unit 26A detects an apparatus ID and outputs the detected apparatus ID to the CPU 21A. It may be configured as in embodiment 1 that a RSSI is outputted and only an apparatus ID whose RSSI is greater than or equal to a predetermined value is extracted. The CPU 21A stores the accepted apparatus ID in association with the creation start date/time in the history file 254A (step S214). The CPU 21A determines whether a specific time has passed or not to detect an apparatus ID (step S215). If the CPU 21A determines that the specific time has not passed (No in step S215), the CPU 21A waits until the specific time passes. On the other hand, if the CPU 21A determines that the specific time has passed (Yes in step S215), the CPU 21A requests the communication unit 26A to detect an apparatus ID again (step S216).

The communication unit 26A detects an apparatus ID and outputs the detected apparatus ID to the CPU 21A. The CPU 21A references date/time information outputted from the clock unit 28A1, and stores the accepted apparatus ID and the date/time information as the detected date/time in the history file 254A (step S217). The CPU 21A determines whether or not a creation end command is accepted from the application program 252A (step S218). If the CPU 21A determines that a creation end command is not accepted from the application program 252A (No in step S218), the process returns to step S215.

On the other hand, if the CPU 21A accepts a creation end command (Yes in step S218), the CPU 21A determines whether or not the item "all users who participated in the meeting" described in FIG. 20 is selected in the custom menu by referring to the storage unit 25A (step S219). If the CPU 21A determines that the item "all users who participated in the meeting" is selected (Yes in step S219), the CPU 21A extracts all of the apparatus IDs corresponding to file names stored in the history file 254A (step S221). On the other hand, if the CPU 21A determines that the item "all users who participated in the meeting" is not selected (No in step S219), the CPU 21A determines whether or not the item "user who participated at the end of the meeting" described in FIG. 20 is selected in the custom menu by referring to the storage unit 25A (step S222).

If the CPU 21A determines that the item "user who participated at the end of the meeting" is selected (Yes in step S222), the CPU 21A extracts an apparatus ID corresponding to the creation end date/time stored in the history file 254A (step S223). On the other hand, if the CPU 21A determines that the item "user who participated at the end of the meeting" is not selected (No in step S222), then the CPU 21A determines that the item "user who participated at the start of the meeting" described in FIG. 20 is selected, and extracts the apparatus ID stored in association with the creation start date/time from the history file 254A (step S224). After the processing of step S221, S223, or S224, the CPU 21A starts up the browser 251A, and sends the user ID and password outputted from the input unit 23A to the server computer 1 (step S225). Then, the CPU 21A logs into the SNS as in embodiment 1.

After that, as described in embodiment 1, the CPU 21A sends the topic name, text, file about proceedings, extracted apparatus ID, creation start date/time, and creation end date/time to the server computer 1 (step S226). Thereby, the users of the computers 2B to 2D may download the proceedings from the server computer 1 as in embodiment 1. As described above, in the present embodiment, a user can disclose the proceedings or the like to the participants without being aware of who the participants in the meeting were.

The operation of embodiment 2 has been described above. Since configurations and actions other than those described above are the same as in embodiment 1, the corresponding parts are given the same reference numerals and detailed description thereof is omitted.

Embodiment 3

Figure 23:
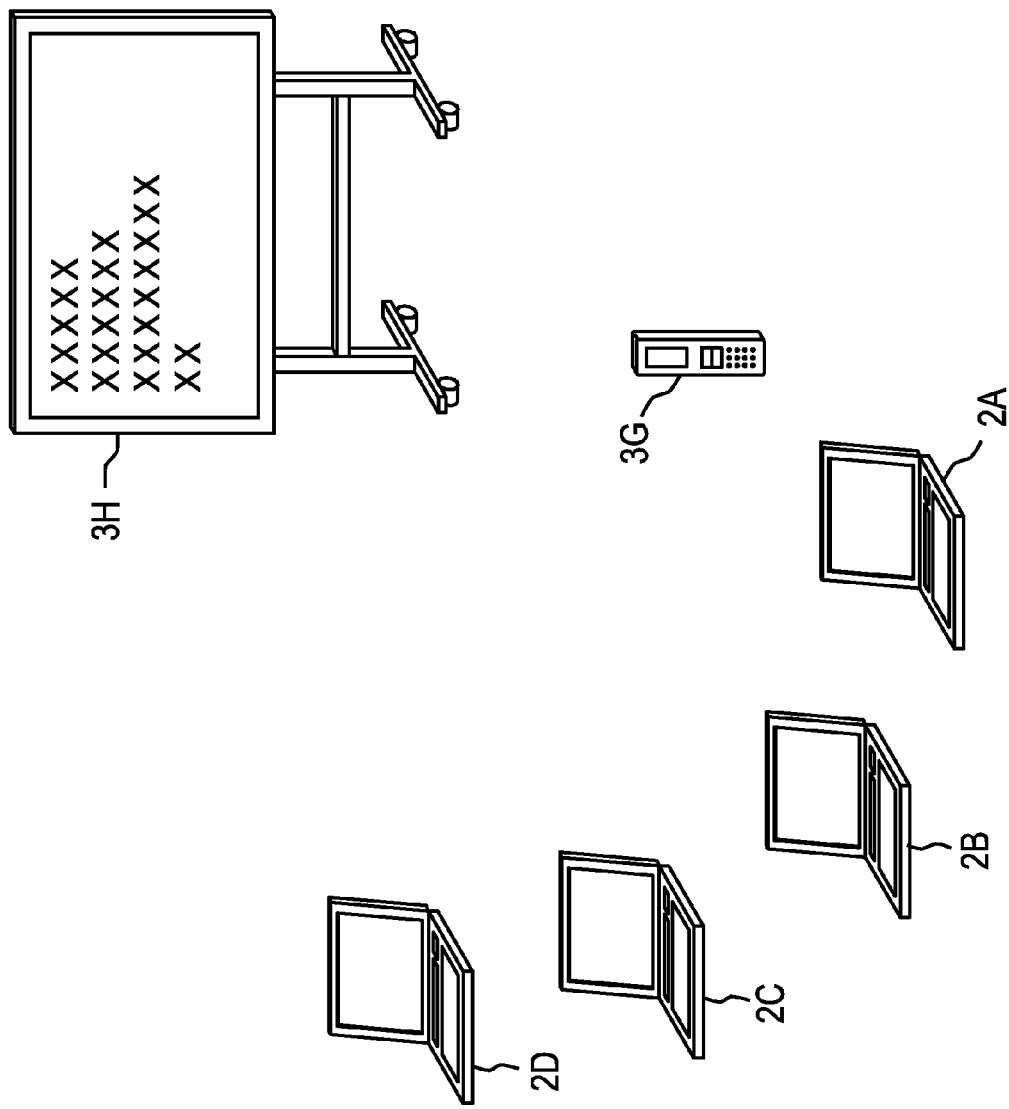
FIG. 23 illustrates a schematic diagram of a content distribution system according to embodiment 3.

Embodiment 3 relates to a configuration in which apparatus 3 does not have an apparatus ID detection function. FIG. 23 is a schematic diagram of a content distribution system according to embodiment 3. In addition to the personal computer 2 described in embodiment 2, the content distribution system has an IC recorder 3G and a whiteboard device 3H (hereinafter referred to as apparatus 3 in some cases). The IC recorder 3G stores audio data in a meeting or the like. The whiteboard device 3H scans characters, graphics, or the like on the whiteboard, and prints or stores scanned character data, image data such as graphics, image data including characters and graphics, or the like. In the present embodiment, a generated content is assumed to be audio data or character data, and a configuration in which particularly audio data generated by the IC recorder 3G is sent to the server computer 1 will be described below.

Figure 24:
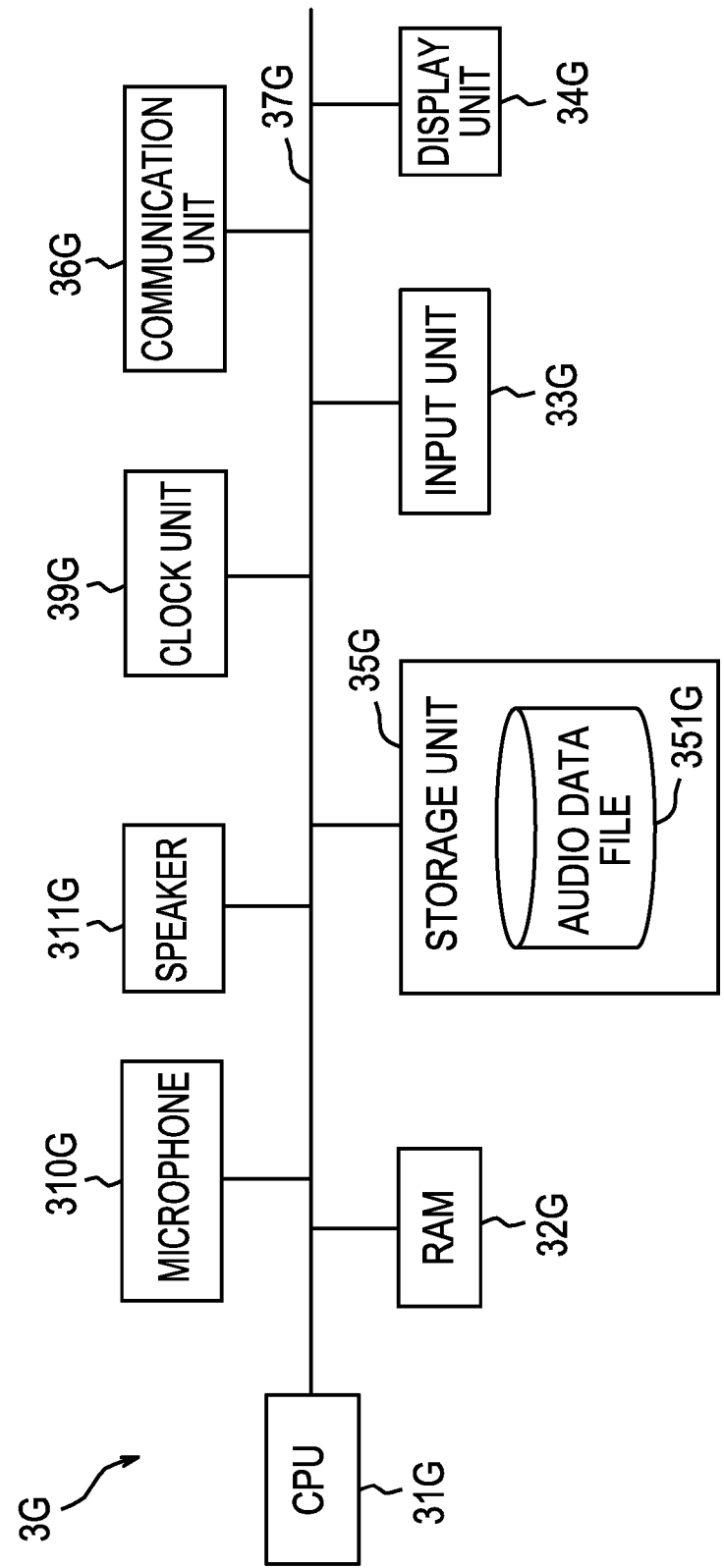
FIG. 24 illustrates a block diagram of a hardware configuration of an IC recorder.

FIG. 24 is a block diagram of a hardware configuration of the IC recorder 3G. The IC recorder 3G includes a CPU 31G, a RAM 32G, an input unit 33G, a display unit 34G, a clock unit 39G, a communication unit 36G, a microphone 310G, a speaker 311G, a storage unit 35G, and the like. The CPU 31G is connected to and controls each part of the hardware of the IC recorder 3G through a bus 37G, and executes various software-like functions according to a control program (not shown) stored in the RAM 32G.

The speaker 311G amplifies and outputs an audio signal of speech inputted from the microphone 310G. The microphone 310G converts an audio signal inputted from outside to an electrical signal. The converted electrical signal is converted to digital audio data by an A/D converter (not shown) and outputted to the CPU 31G. The communication unit 36G may be, for example, a USB port and outputs audio data to the personal computer 2 through a USB cable (not shown). The clock unit 39G outputs present date/time information to the CPU 31G. The input unit 33G may include, for example, various operation buttons such as a record button. The display unit 34G may be, for example, a liquid crystal display for displaying various information.

The storage unit 35G may be, for example, a large capacity memory. In the storage unit 35G, an audio data file 351G is stored. The CPU 31G stores audio data inputted through the microphone 310G in the audio data file 351G. The CPU 31G references date/time information outputted from the clock unit 39G, and stores a creation start date/time at which the recording of the audio data starts and a creation end date/time at which the recording of the audio data ends in association with the audio data in the audio data file 351G. When the IC recorder 3G is connected with the personal computer 2A, the CPU 31G reads out the audio data, creation start date/time, creation end date/time stored in the audio data file 351G and outputs the data through the communication unit 36G to the personal computer 2A.

The personal computer 2A detects an apparatus ID of a personal computer 2B or the like existing in a communication zone using the communication unit 26A as described in embodiment 2. When the communication unit 26A detects the apparatus ID, the CPU 21A stores the apparatus ID together with date/time information outputted from the clock unit 28A1 in the history file 254A. This apparatus ID detection is performed at a specific interval, e.g., 10 seconds, and an apparatus ID detected during the meeting is stored in the history file 254A as occasion arises. When the CPU 21A accepts input of audio data, a creation start date/time, a creation end date/time from the IC recorder 3G through the USB port (not shown), the CPU 21A stores these information in the history file 254A.

FIG. 25 is an explanatory diagram of a record layout of the history file 254A according to embodiment 3. The history file 254A includes a file name field, a creation start date/time field, a creation end date/time field, an apparatus ID field, and a detection date/time field. The CPU 21A stores an audio data filename, a creation start date/time, and a creation end date/time which are outputted from the IC recorder 3G in the file name field, the creation start date/time field, and the creation end date/time field. An apparatus ID detected between the creation start date/time field and the creation end date/time field and a date/time at which the apparatus is detected are stored in the ID field and the detection date/time field.

Figure 26:
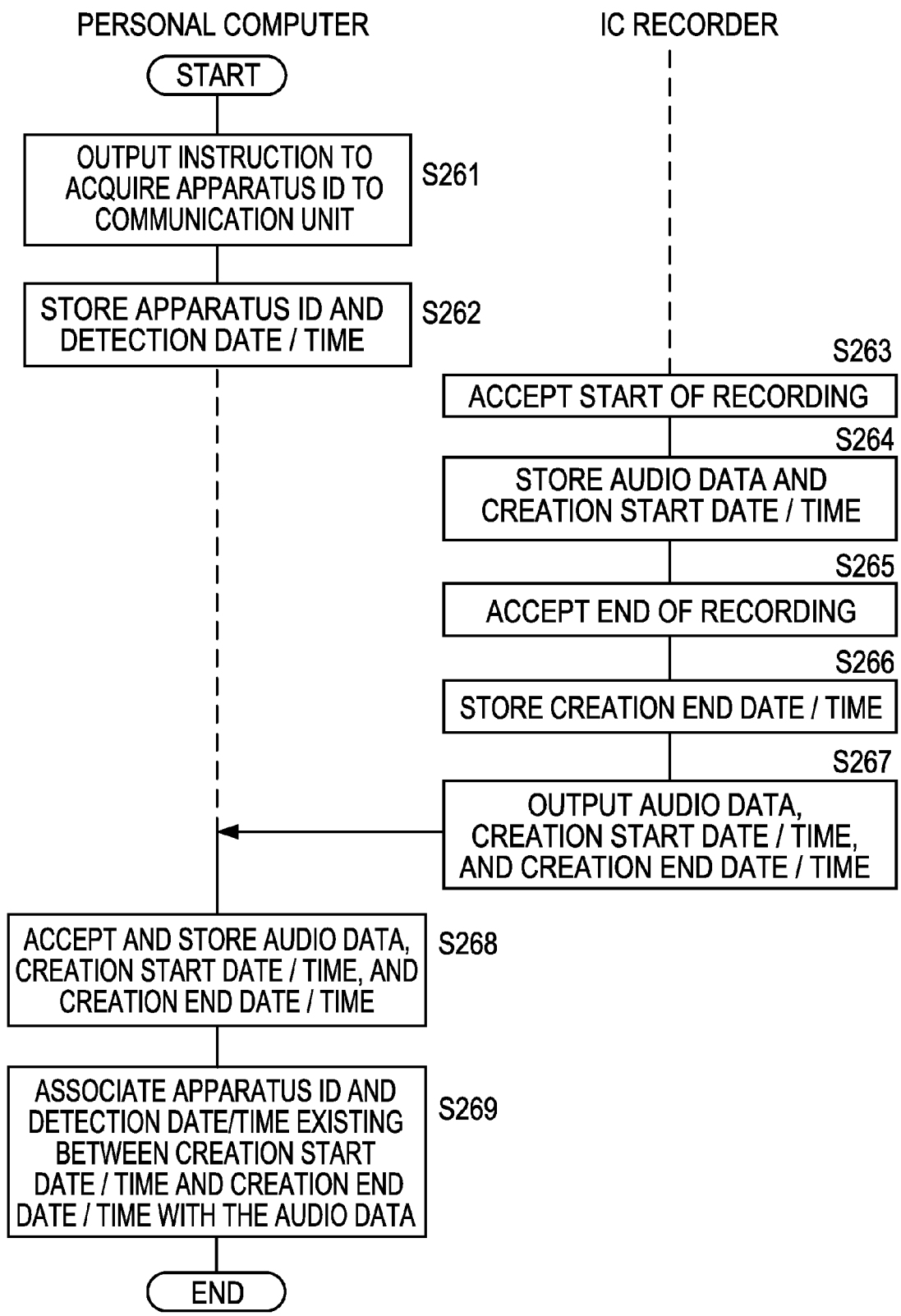
FIG. 26 illustrates a flowchart of a procedure of processing for storing audio data and an apparatus ID.

FIG. 26 is a flowchart of a procedure of processing for storing audio data and an apparatus ID. The CPU 21A of the personal computer 2A outputs an instruction to acquire an apparatus ID to the communication unit 26A (step S261). The communication unit 26A detects an apparatus ID at specific times and outputs the detected apparatus ID to the CPU 21A. Each time the CPU 21A accepts an apparatus ID, the CPU 21A requests date/time information from the clock unit 28A1. The CPU 21A stores the received apparatus ID and the detection date/time outputted from the clock unit 28A1 in the history file 254A (step S262). On the other hand, the CPU 31G of the IC recorder 3G accepts an instruction to start recording from the input unit 33G (step S263).

Next, the CPU 31G stores audio data inputted from the microphone 310G and date/time information outputted from the clock unit 39G in the audio data file 351G (step S264). The CPU 31G accepts an instruction to end recording from the input unit 33G (step S265). Then, the CPU 31G stops storing of audio data, and stores a creation end date/time outputted from the clock unit 34G in association with the audio data and the creation start date/time in the audio data file 351G (step S266).

The CPU 31G outputs the audio data, creation start date/time, and creation end date/time stored in the audio data file 351G to the personal computer 2A through the communication unit 36G (step S267). The CPU 31G stores the outputted audio data, creation start date/time, and creation end date/time in the history file 254A (step S268). The CPU 21A stores an apparatus ID and its detection date/time existing between the creation start date/time and the creation end date/time in association with the audio data in the history file 254A (step S269). In the example of FIG. 25, detection date/times between the creation start date/time, February 10th 10:00, and 10:30 in the same day and apparatus IDs corresponding to the detection date/times are stored in the history file 254A. Further processing is the same as the processing from step S219, and detailed description thereof is omitted. In this way, even in a case where the apparatus 3G does not have an apparatus ID detection function, the similar system can be built using the personal computer 2 or the like having an apparatus ID detection function. For the whiteboard device 3H also, scanned character or image data, and a creation start date/time and a creation end date/time are stored in a storage unit (not shown), and then processing similar to the above is executed.

The operation of embodiment 3 has been described above. Since configurations and actions other than those described above are the same as in embodiments 1 and 2, the corresponding parts are given the same reference numerals and detailed description thereof is omitted.

Embodiment 4

Embodiment 4 relates to a configuration in which a plurality of contents are sent to a plurality of users. FIG. 27 is an explanatory diagram of a record layout of the content DB 153. The content DB 153 stores, separately for each user ID, image data, an image ID, an apparatus ID, and the like with respect to each topic. A plurality of image data is stored in a topic 1. In this example, image data ID "I001" and "I002" are used for example. The CPU 11 of the server computer 1 determines relevance of image data based on a topic, text, or a photographing date/time in the content DB 153. If the CPU 11 determines that the image data has relevance, the CPU 11 reads out all user ID related to the respective image data. Then, the respective image data is disclosed to all the read-out user IDs.

In the example of FIG. 27, user IDs corresponding to apparatus IDs of image data "I001" are three user IDs "U003B", "U003C", and "U003D". On the other hand, user IDs corresponding to apparatus IDs of image data "I002" are the three user IDs "U003B", "U003C", and "U003E". Since topics of these image data are the same and the difference in photographing date/time is only 1 minute and 30 seconds, the image data may be considered as image data related to the same camp in which the users participated. In the present embodiment, related items of image data are adapted to be viewable mutually between users. For example, a user of user ID "U003D" can view image data "I001" because the apparatus ID of user ID "U003D" has been detected, and can also view image data "I002" in which the apparatus ID of user ID "U003D" has not been detected. In a similar way, a user of user ID "U003E" can view image data "I002" because the apparatus ID of user ID "U003E" has been detected, and can also view image data "I001" in which the apparatus ID of user ID "U003E" has not been detected.

In the content DB 153, a viewing user ID field is additionally provided. The CPU 11 stores all user IDs corresponding to a plurality of related image data in the viewing user ID field. In this example, "U003B", "U003C", "U003D", and "U003E" are stored as user IDs to which image data is disclosed in the viewing user ID field. In the disclosure DB 154 shown in FIG. 8, as a distribution target (a target to which image data is disclosed) of user ID "U003A", user IDs "U003B", "U003C", "U003D", and "U003E" have been stored.

Figure 28:
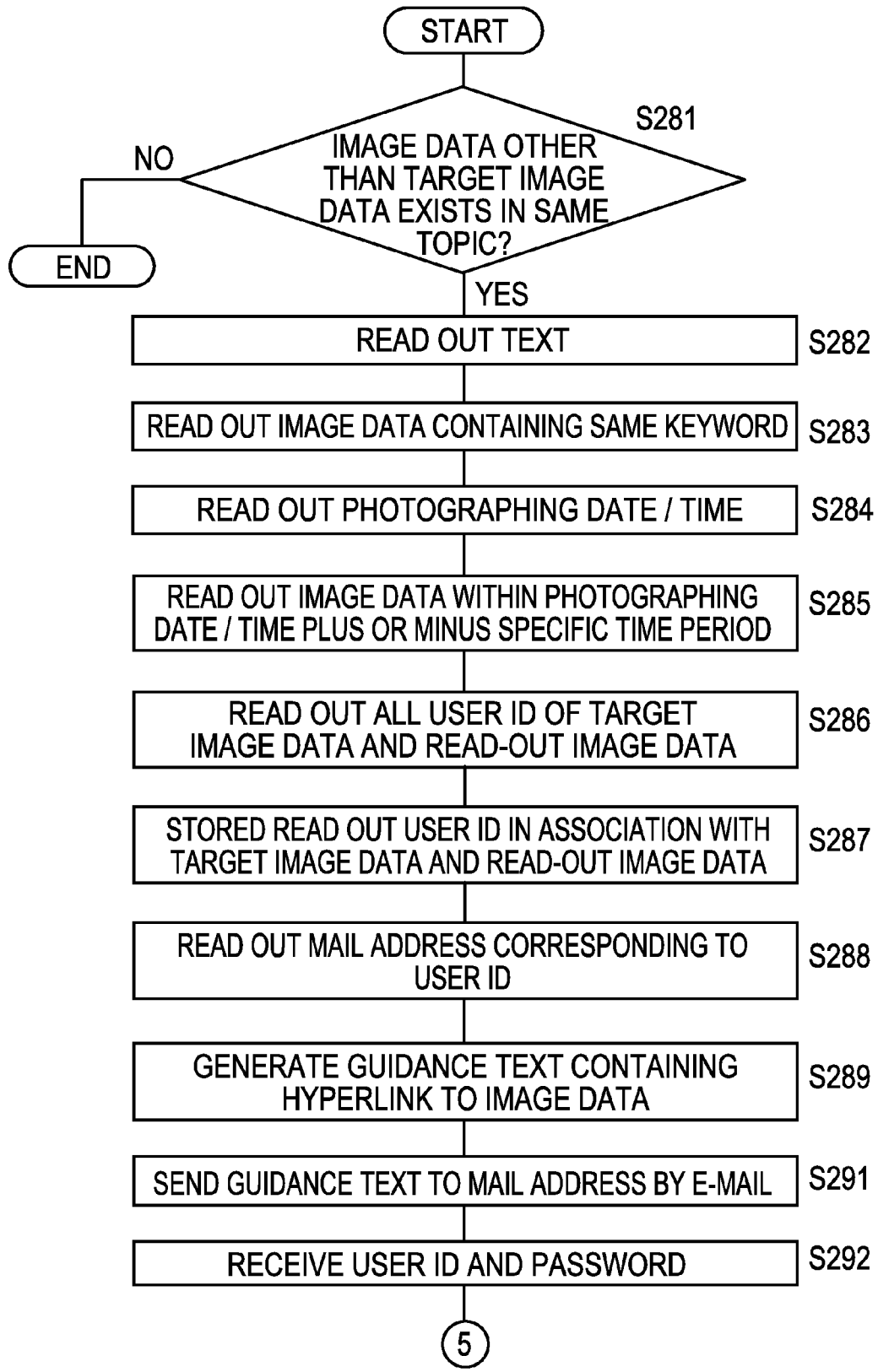
FIG. 28 illustrates a flowchart of a procedure of processing for disclosing image data.
Figure 29:
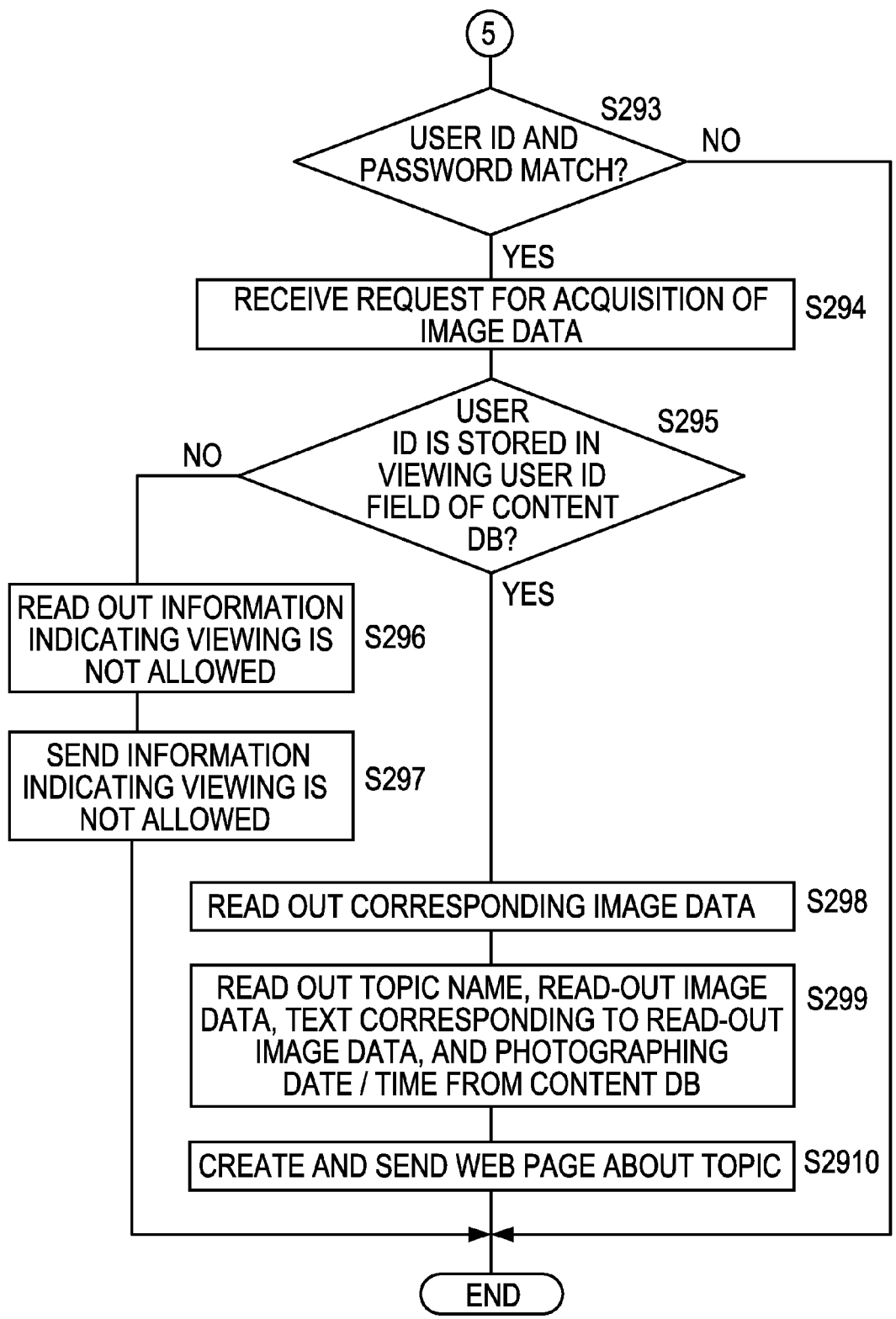
FIG. 29 illustrates a flowchart of a procedure of processing for disclosing image data.

FIGS. 28 and 29 are flowcharts of procedures of processing for disclosing image data. After the processing of step S1421 described in embodiment 1, the following processing is executed by the server computer 1. The CPU 11 of the server computer 1 determines whether or not image data other than target image data (in the above example, image data of ID "I001") in the same topic exists in the content DB 153 (step S281). If the CPU 11 determines that image data other than target image data does not exist in the content DB 153 (No in step S281), the CPU 11 terminates the process. On the other hand, if the CPU 11 determines that image data other than target image data exists in the content DB 153 (Yes in step S281), the CPU 11 reads out text of the target image data and the other image data from the content DB 153 (step S282).

The CPU 11 extracts a word (e.g., a keyword) contained in the read-out text. Then, the CPU 11 reads out image data which contains the same keyword as the keyword contained by the target image data (step S283). The CPU 11 reads out a photographing date/time of the image data read out in step S283, from the content DB 153 (step S284). The CPU 11 reads out image data from within a specific time period (for example, 1 hour) before and after the read-out photographing date/time in relation to the photographing date/time of the target image data (step S285). In the example of FIG. 27, the photographing date/time of the target image data is February 7th, 10:30:30, and therefore image data whose photographing date/time is between 9:30:30 and 11:30:30 is read out.

By the processing of steps S281 to S285, image data relevant to the target image data is read out. In the present embodiment, image data to be read out belongs to the same topic as the target image data, has the same keyword in the text as the target image data, and has a photographing date/time within the photographing date/time of the target image data plus or minus the specific time period. Although image data which satisfies the above three conditions is read out in the present embodiment, image data which satisfies one or two of the three conditions may be read out. For example, all image data stored in topics related to the same user ID (in this example, user ID "U003A") of the content DB 153 may be read out as relevant image data. Further, all text related to the same user ID of the content DB 153 may be read out and then image data having the same keyword as that in text of a target image data may be read out as relevant image data. Further, of image data related to the same user ID of the content DB 153, all image data whose photographing date/time is within the photographing date/time of the target image data plus or minus the specific time period may be relevant image data.

The CPU 11 reads out all user IDs of the target image data and read-out image data from the content DB 153 (step S286). The CPU 11 stores the read-out IDs in association with the target image data and read-out image data in the viewing user ID field of the content DB 153 (step S287). The CPU 11 reads out a mail address corresponding to the user ID stored in step S287 from the DB 152 (step S288). The CPU 11 generates guidance text containing hyperlinks to the target image data and the plurality of image data read out in step S285 (step S289). Specifically, text indicating that the image data is uploaded is read out from the storage unit 15, and a hyperlink to access each image data is added to the body text of an e-mail.

The CPU 11 sends the guidance text to the mail address read out in step S288 by e-mail (step S291). After that, access from personal computer 2 of each user to the server computer 1 may be started. The CPU 11 of the server computer 1 receives a user ID and a password (step S292). The CPU 11 determines whether or not the received user ID and password match the user ID and password stored in the user ID file 151 by referring to the user ID file 151 (step S293). If the CPU 11 determines that the received user ID and password do not match the user ID and password stored in the user ID file 151 (No in step S293), the CPU 11 considers the access as an unauthorized access and terminates the process. On the other hand, if the CPU 11 determines that the received user ID and password match the user ID and password stored in the user ID file 151 (Yes in step S293), the CPU 11 receives a request for acquisition of image data associated with clicking on a hyperlink contained in the e-mail sent in step S291 (step S294).

The CPU 11 determines whether or not the user ID received in step S292 is stored in a viewing user ID field corresponding to the requested image data in the content DB 153 (step S295). If the CPU 11 determines that the user ID is not stored in the content DB 153 (No in step S295), the CPU 11 reads out information from the storage unit 15 indicating viewing is not allowed (step S296). This information may be, for example, text such as "This image cannot be viewed." The CPU 11 sends the read-out information indicating viewing is not allowed to personal computer 2 (step S297).

On the other hand, if the CPU 11 determines that the user ID is stored in the content DB 153 (Yes in step S295), the CPU 11 reads out all image data corresponding to user IDs stored in the viewing user ID (step S298). The CPU 11 reads out a name of the topic to which the read-out image data belongs, the read-out image data, text corresponding to the read-out image data, and a photographing date/time from the content DB 153 (step S299). The CPU 11 creates a web page related to the topic and sends it to personal computer 2 (step S2910). Specifically, the CPU 11 sends the web page including the read-out image data, text, and photographing date/time in addition to the topic name.

Figure 30:
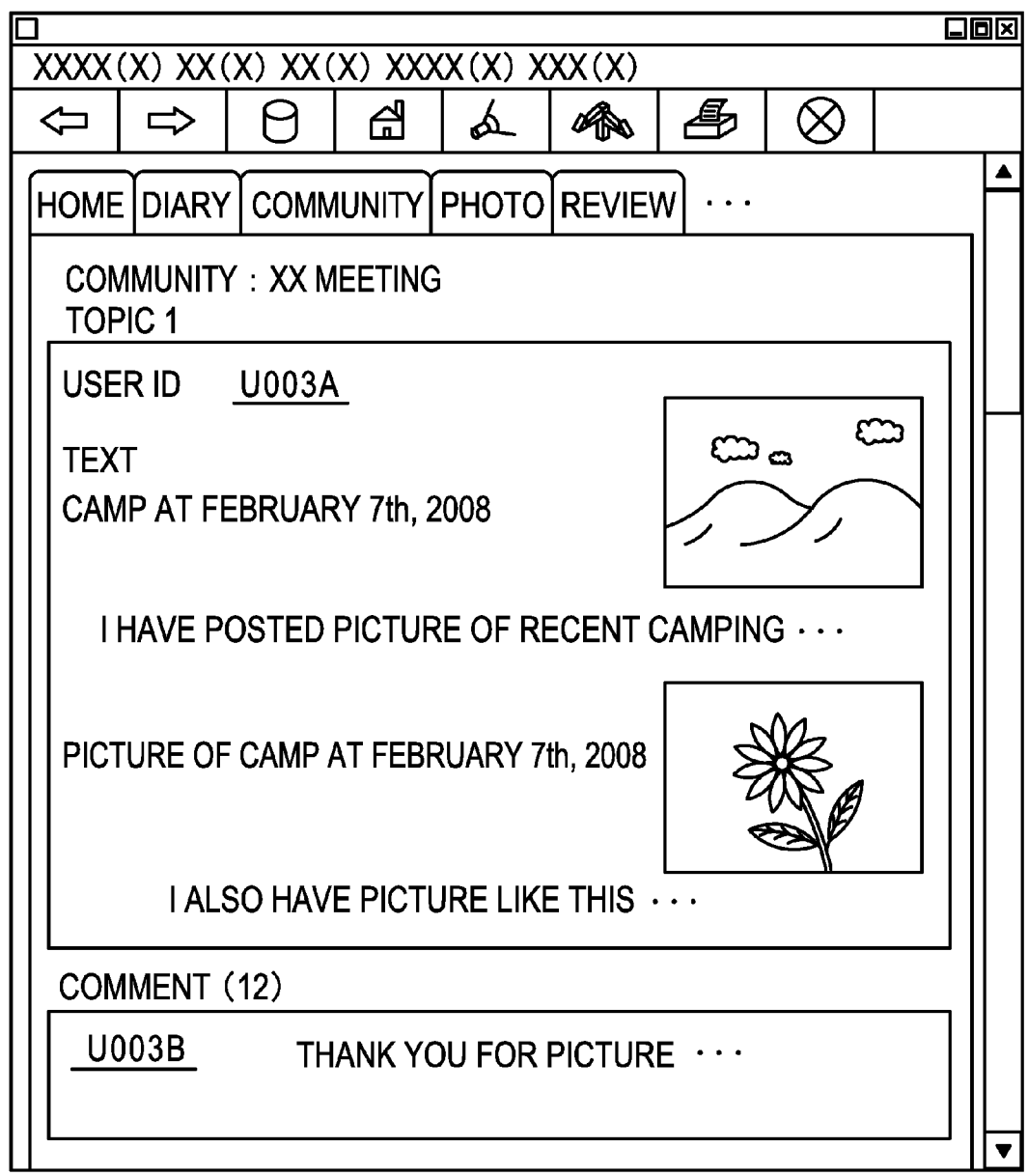
FIG. 30 illustrates an explanatory diagram of a display image of image data.

FIG. 30 is an explanatory diagram of a display image of image data. The example of FIG. 30 shows an image of a topic of user ID "U003A" viewed by the personal computer 2 of user ID "U003E". The browser displays not only image data of image data ID "I002" based on a detected apparatus ID, but also relevant image data of image data ID "I002". In this manner, because relevance of image data is detected by the server computer 1, not only image data related to a detected apparatus ID but also relevant image data can be disclosed without special intention.

The operation of embodiment 4 has been described above. Since configurations and actions other than those described above are the same as in embodiments 1 to 3, the corresponding parts are given the same reference numerals and detailed description thereof is omitted.

Embodiment 5

Embodiment 5 relates to a configuration in which a plurality of contents uploaded by a plurality of users are mutually associated. FIG. 31 is an explanatory diagram of a record layout of the content DB 153 according to embodiment 5. As shown in FIG. 31, a user of user ID "U003A" discloses image data of image ID "I001" to a user of user ID "U003B" having the camera 3B. On the other hand, the user of user ID "U003B" discloses image data of image ID "I003" to the user of user ID "U003A" having the camera 3A. Further, the user of user ID "U003B" discloses image data of image ID "I004" to a user of user ID "U003C" having the camera 3C and a user of user ID "U003E" having the camera 3E. In this example, in the disclosure DB 154, user IDs "U003B", "U003C", and "U003E" are stored in association with user ID "U003A", and user IDs "U003A", "U003C", and "U003E" are stored in association with user ID "U003B". Thus, in the example of FIG. 31, it is assumed that disclosure is performed between all the shown users.

When the image data of image ID "I001" related to one content generator (in this example, user ID "U003A") is stored in the content DB 153, the CPU 11 of the server computer 1 reads out, based on a user ID corresponding to the image data (in the example, user ID "U003B"), image data of another content generator (in the example, user ID "U003B") and the corresponding user ID. In this example, image data of image ID "I003" and user ID "U003A", and image data of image ID "I0004" and user IDs "U003C" and "U003E" are read out. Whether or not read-out image data has relevance may be determined based on a photographing date/time, so that only the relevant data is processed.

The CPU 11 extracts user IDs except the user ID of the one content generator. Then, the CPU 11 stores the extracted user IDs "U003C" and "U003E" in association with image data of the one generator in an additional viewing user ID field. When the CPU 11 accepts a request for acquisition of image ID "I001" along with user ID "U003C" or "U003E", the CPU 11 sends the image data of image ID "I001" to the personal computer 2 related to "U003C" or "U003E". Thereby, image data photographed by another content generator can be provided to a relevant user without intention of the one content generator.

Figure 32:
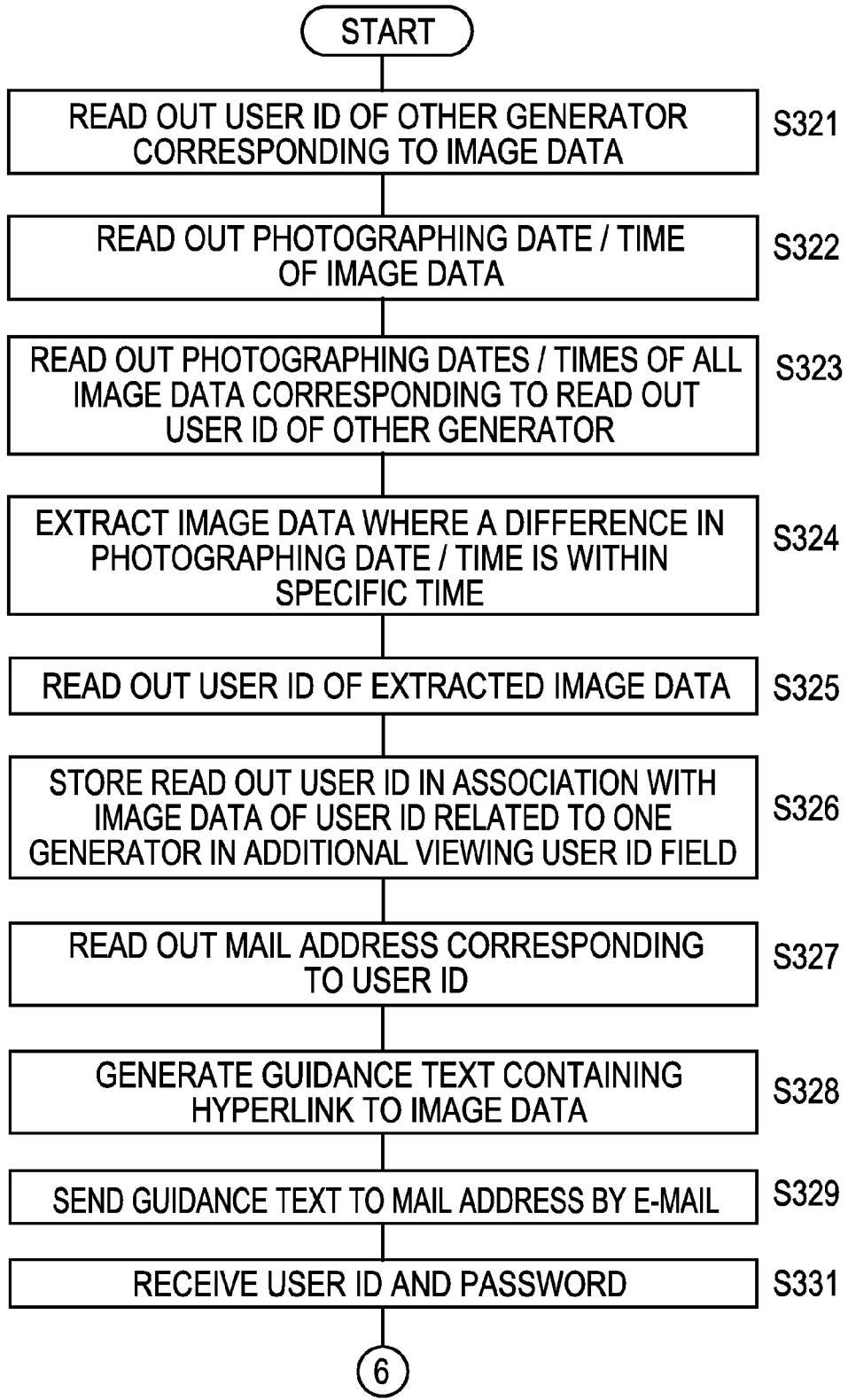
FIG. 32 illustrates a flowchart of a procedure of processing for sending image data.
Figure 33:
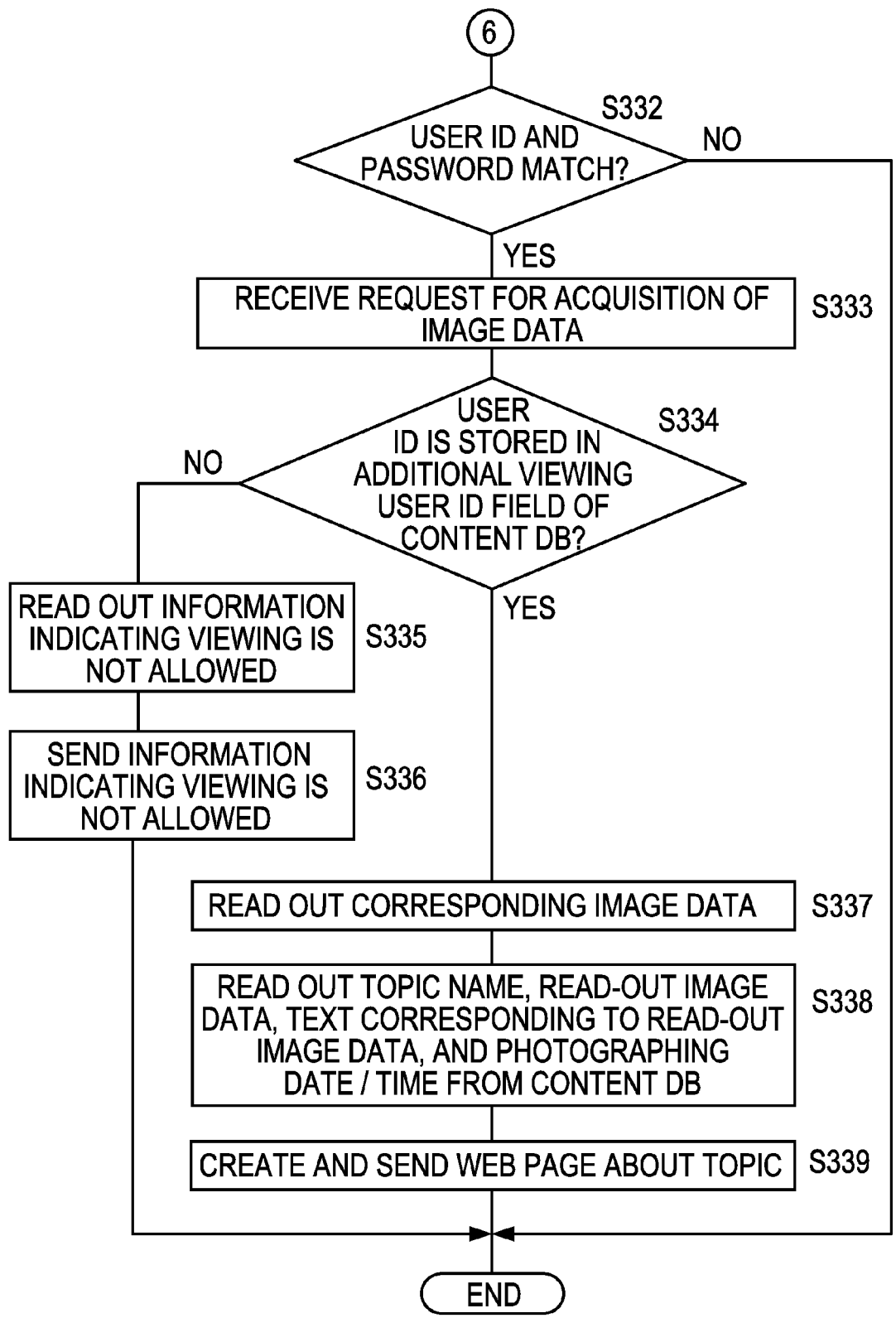
FIG. 33 illustrates a flowchart of a procedure of processing for sending image data.

FIGS. 32 and 33 are flowcharts of procedures of processing for sending image data. After step S1421 described in Embodiment 1 (FIG. 14), the CPU 11 of the server computer performs the following processing. The CPU 11 reads out a user ID of another generator stored in association with the image data of the one generator from the content DB 153 (step S321). In addition, the CPU 11 reads out a photographing date/time corresponding to the image data from the content DB 153 (step S322). The CPU 11 reads out photographing dates/times of all image data corresponding to the read-out user ID of the other generator from the content DB 153 (step S323).

The CPU 11 performs extraction processing of relevant image data from the read-out image data. Although the extraction processing may be perform in the method described in embodiment 4, image data with a difference in photographing date/time of image data is within a predetermined time (e.g. 10 hours) is defined as relevant image data. The CPU 11 extracts image data where a difference between the photographing date/time read out in step S322 and the photographing date/time read out in step S323 is within the predetermined time (step S324). The CPU 11 read out a user ID corresponding to the extracted image data from the content DB 153 (step S325). The CPU 11 stores the user ID read out in step S325 in association with the image data of the user ID related to the one generator in the additional viewing user ID field (step S326). At this time, the CPU 11 deletes the user ID of the one generator if the generator exists in user IDs to be stored.

The CPU 11 reads out a mail address corresponding to the user ID stored in the additional viewing user ID from the DB 152 (step S327). The CPU 11 generates a guidance text containing a hyperlink to the target image data of the one generator (step S328). Specifically, text indicating that the image data is uploaded is read out from the storage unit 15, and a hyperlink to access the image data is added to the body text of an e-mail.

The CPU 11 sends the guidance text to the mail address read out in step S327 by the e-mail (step S329). After that, access from the personal computer 2 of each user to the server computer 1 may be started. The CPU 11 of the server computer 1 receives a user ID and a password (step S331). The CPU 11 determines whether or not the received user ID and password match the user ID and password stored in the user ID file 151 by referring to the user ID file 151 (step S332). If the CPU 11 determines that the received user ID and password do not match the user ID and password stored in the user ID file 151 (No in step S332), the CPU 11 considers the access as an unauthorized access and terminates the process. On the other hand, if the CPU 11 determines that the received user ID and password match the user ID and password stored in the user ID file 151 (Yes in step S332), the CPU 11 receives a request for acquisition of image data associated with clicking on a hyperlink contained in the e-mail sent in step S329 (step S333).

The CPU 11 determines whether or not the user ID received in step S331 is stored in an additional viewing user ID field corresponding to the requested image data in the content DB 153 (step S334). If the CPU 11 determines that the user ID is not stored in the additional viewing user ID field (No in step S334), the CPU 11 reads out information from the storage unit 15 indicating viewing is not allowed (step S335). The CPU 11 sends the read-out information indicating viewing is not allowed to the personal computer 2 (step S3336).

On the other hand, if the CPU 11 determines that the user ID is stored in the additional viewing user ID field (Yes in step S334), the CPU 11 reads out the corresponding image data (step S337). The CPU 11 reads out a name of the topic to which the read-out image data belongs, the read-out image data, text corresponding to the read-out image data, and a photographing date/time from the content DB 153 (step S338). The CPU 11 creates a web page related to the topic and sends it to the personal computer 2 (step S339).

The operation of embodiment 5 has been described above. Since configurations and actions other than those described above are the same as in embodiments 1 to 4, the corresponding parts are given the same reference numerals and detailed description thereof is omitted.

Embodiment 6

Figure 34:
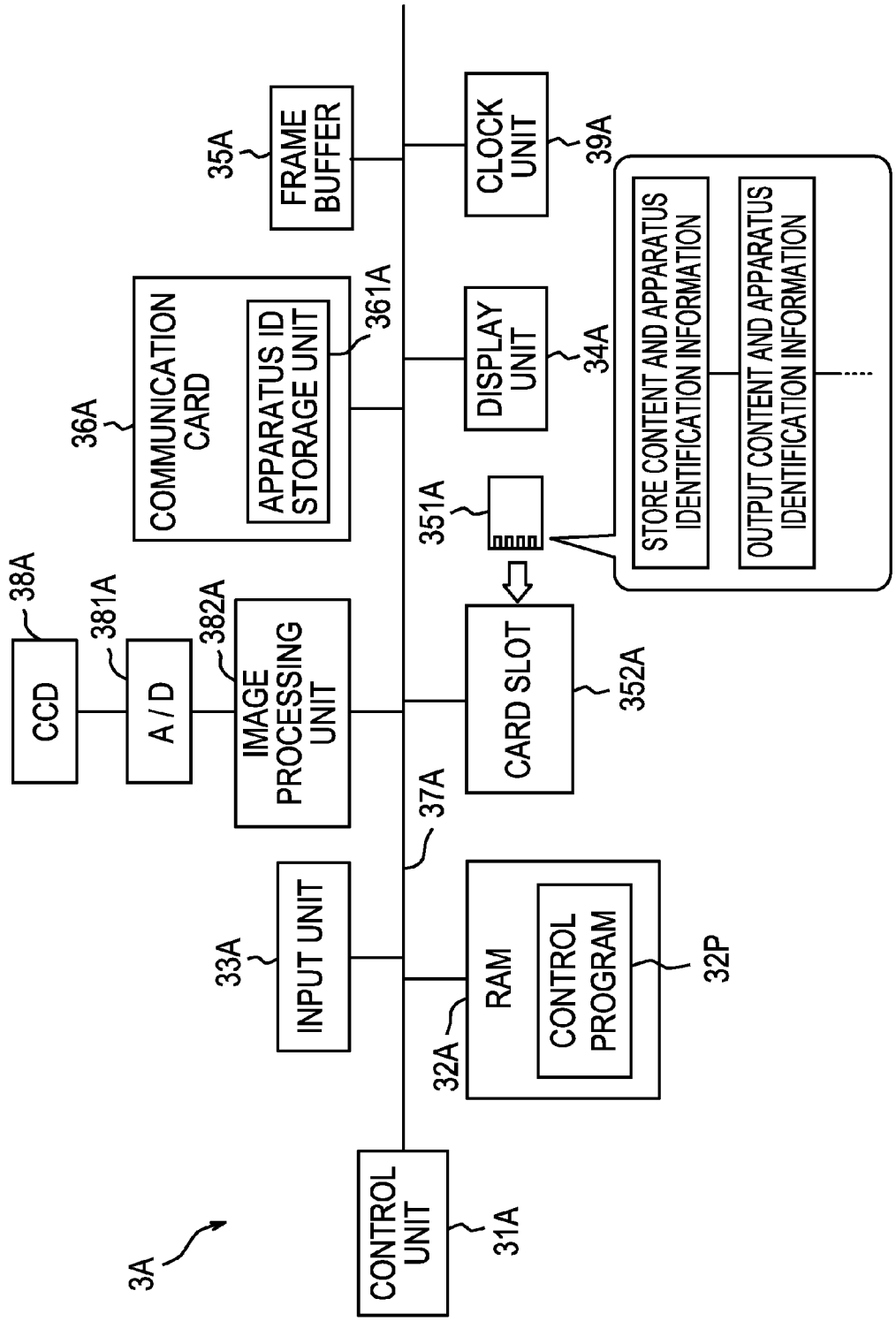
FIG. 34 illustrates a block diagram of a configuration of a camera according to embodiment 6

FIG. 34 is a block diagram of a configuration of the camera 3A according to embodiment 6. The program for operating apparatus 3 such as the camera 3A according to embodiments 1 to 5 may be stored in the RAM 32A by the memory card 351A to be read through the card slot 352A or may be downloaded from another computer (not shown) connected through the communication card 36A as in the present embodiment 6. Details of this will be described below.

The camera 3A shown in FIG. 34 downloads a program which causes a content and apparatus identification information to be stored, outputted, etc. from another computer (not shown) using the memory card 351A or through the communication card 36A, and installs the program as the control program 32P of the RAM 32A. Such a program is loaded in the RAM 32A and executed. Thereby, the camera 3A functions as apparatus 3 of the present invention as described above.

Figure 35:
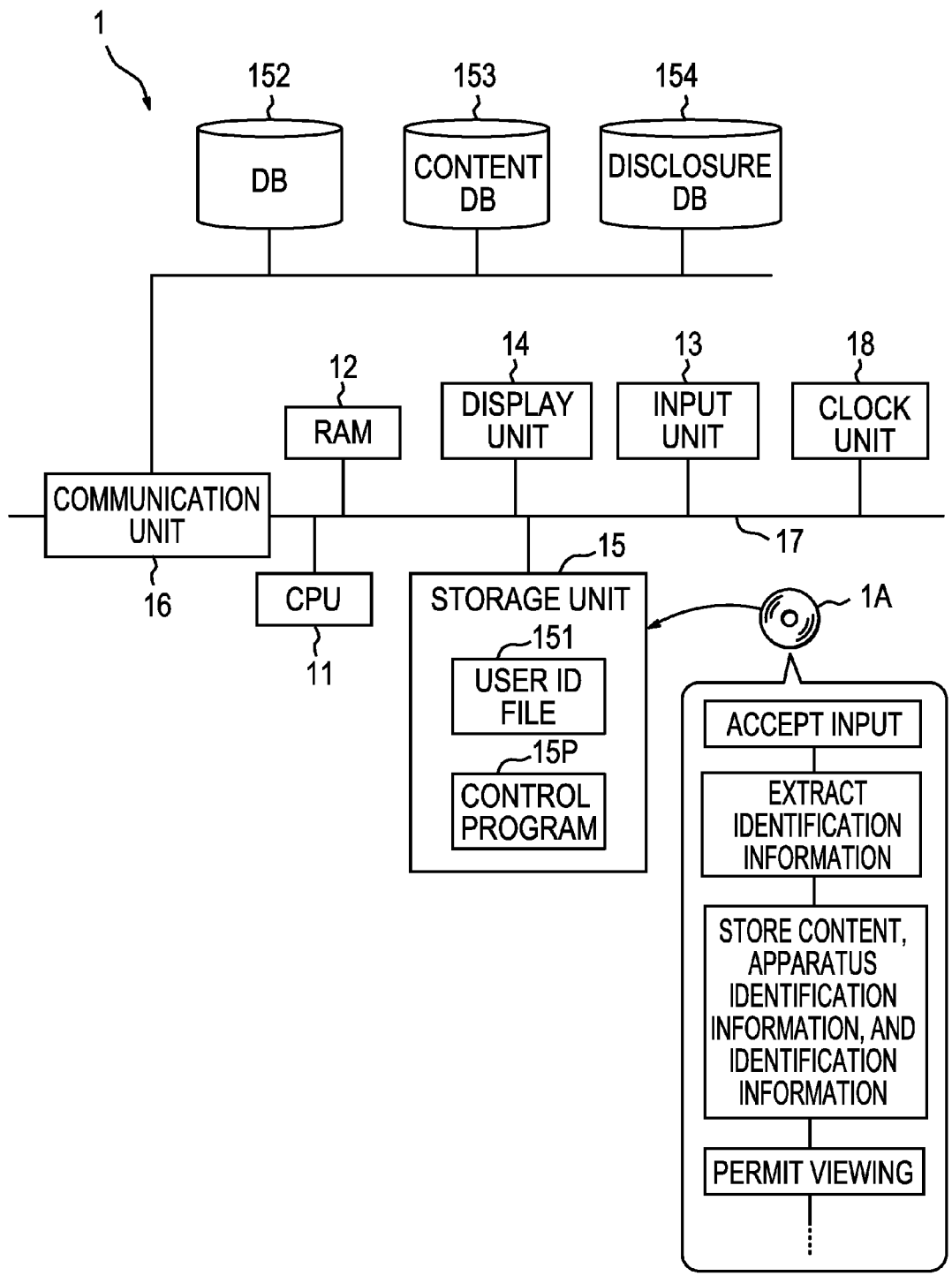
FIG. 35 illustrates a block diagram of a configuration of a server computer according to embodiment 6.

FIG. 35 is a block diagram of a configuration of the server computer 1 according to embodiment 6. The program for operating the server computer 1 according to embodiments 1 to 5 may be stored in the storage unit 15 by a recording medium 1A such as a CD-ROM to be read by a recording medium reading device (not shown) or may be downloaded from another computer (not shown) connected through the communication network N as in the present embodiment 6. Details of this will be described below.

The server computer 1 shown in FIG. 35 downloads a program which causes an input to be accepted, identification information to be extracted, a content, apparatus identification information, and identification information to be stored, and a content to be allowed to be viewed, and the like from another computer (not shown) using the recording medium 1A or through the communication unit 16, and installs the program as the control program 15P of the storage unit 15. Such a program is loaded in the RAM 12 and executed. Thereby, this server computer functions as the server computer 1 of the present invention as described above.

The operation of embodiment 6 has been described above. Since configurations and actions other than those described above are the same as in embodiments 1 to 5, the corresponding parts are given the same reference numerals and detailed description thereof is omitted.

According to one aspect of the content distribution system, a content and apparatus identification information of an apparatus that exists in the vicinity when the content is generated are received. Then, the content is allowed to be disclosed to an information processor related to identification information corresponding to the received apparatus identification information. Due to this configuration, the present invention has an effect such as that in disclosing a content, information can be provided efficiently to another user who is or was in the vicinity when the content is generated without setting a range of disclosing for each content.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A content distribution system which stores a content generated by an apparatus in a storage device by a server computer and sends the content to an information processor, the content distribution system comprising:
    an apparatus comprising:
        a first processor coupled to a first memory, configured to:
            detect apparatus identification information of another apparatus existing in a vicinity, and
            store the apparatus identification information in association with the content when the content is generated;

an information processor comprising:
- a second processor coupled to a second memory, configured to send the content and apparatus identification information; and a server computer comprising:
- a third processor coupled to a third memory, configured to:
  - receive the content and apparatus identification information sent from the information processor,
  - refer to a database in which the identification information is stored in association with the apparatus identification information,
  - extract identification information corresponding to the apparatus identification information received,
  - store the content and apparatus identification information received and the identification information extracted in an associated manner in the storage device, and
  - send the content stored in the storage device to another information processor corresponding to identification information received from outside when the identification information received from the outside matches the identification information stored in the storage device.

2. A content distribution system which stores a content sent from an information processor in a storage device by a server computer and sends the content to the information processor, the content distribution system comprising:

an information processor comprising:
- a first processor coupled to a memory, configured to:
  - generate a content,
  - detect apparatus identification information of another apparatus existing in a vicinity,
  - store the apparatus identification information in association with the content when the content is generated, and
  - send the content and apparatus identification information; and a server computer comprising:
- a second processor coupled to a second memory, configured to:
  - receive the content and apparatus identification information sent from the information processor;
  - extract identification information corresponding to the apparatus identification information by referring to a database in which the identification information is stored in association with the apparatus identification information,
  - store the content and apparatus identification information received and the identification information extracted in an associated manner in the storage device, and
  - send the content stored in the storage device to another information processor corresponding to identification information received from outside when the identification information received from the outside matches the identification information stored in the storage device.

3. A server computer which stores a received content in a storage device, the server computer comprising:
- a processor coupled to a memory, configured to:
  - receive, from outside, a content and apparatus identification information of an apparatus that existed in a vicinity when the content was generated,
  - refer to a database in which the identification information is stored in association with the apparatus identification information,
  - extract identification information corresponding to the apparatus identification information,
  - store the content and apparatus identification information received and the identification information extracted in an associated manner in the storage device; and
  - send the content stored in the storage device to another information processor corresponding to identification information received from outside when the identification information received from the outside matches the identification information stored in the storage device.

4. The server computer according to claim 3, further comprising:
- a target file which stores identification information of a target to which the content is sent in association with identification information of a generator of the content,
- wherein the processor is configured to store, in the storage device, the content, the apparatus identification information, and the identification information in association with the identification information of the generator of the content, and
- wherein the processor is configured to send the content stored in the storage device to the information processor corresponding to the identification information received from the outside when the identification information received from the outside matches the identification information stored in the storage device and the identification information received from the outside matches the identification information stored in the target file.

5. The server computer according to claim 3,
- wherein the processor is further configured to read out a plurality of identification information corresponding to a plurality of contents of one generator from the storage device,
- wherein the processor is configured to store the content, the apparatus identification information, and the identification information in association with identification information of the generator of the content, and
- wherein the processor is configured to send the plurality of contents stored in the storage device to the information processor corresponding to the identification information received from the outside when the identification information received from the outside matches any of the plurality of identification information read out.

6. The server computer according to claim 3, wherein the processor is configured to store the content, the apparatus identification information, and the identification information in association with identification information of a generator of the content, and wherein
the processor is further configured to:
- read out identification information corresponding to identification information of one generator from the storage device,
- read out a content and identification information corresponding to identification information of another generator that matches the identification information, from the storage device, and
- send the content of the one generator stored in the storage device, to an information processor corresponding to the identification information read out.

7. A non-transitory computer-readable storage medium storing a program to store a received content in a storage device, the program, when executed by a processor, performs a method comprising:

accepting a content and apparatus identification information of an apparatus that existed in a vicinity when the content was generated;

extracting identification information corresponding to the apparatus identification information accepted by the accepting function by referring to a database in which the identification information is stored in association with the apparatus identification information;

storing the content and apparatus identification information accepted by the accepting function and the identification information extracted by the extracting function in an associated manner in the storage device; and permitting viewing of the content stored in the storage device for an information processor corresponding to the accepted identification information when the accepted identification information matches the identification information stored in the storage device.

8. A method of controlling a system including a server computer and a storage device, the method comprising:

receiving by the server computer, a content and apparatus identification information of an apparatus that existed in a vicinity when the content was generated;

extracting first identification information corresponding to the apparatus identification information from a database in which the first identification information is stored in association with the apparatus identification information;

storing the content, the apparatus identification information and the first identification information in an associated manner in the storage device; and first sending the content stored in the storage device to an information processor when the first identification information is received from the information processor.

9. The method according to claim 8, wherein the system includes a target file which stores the first identification information indicating a target to which the content is sent, in association with second identification information of a generator of the content, wherein the storing stores, in the storage device, the content, the apparatus identification information, and the first identification information in association with the second identification information.

10. The method according to claim 8, further comprising:

reading-out a plurality of identification information corresponding to a plurality of contents of one generator from the storage device, wherein the storing stores the plurality of contents, the apparatus identification information, and the identification information in association with second identification information of the generator of the content, and wherein the first sending sends the plurality of contents stored in the storage device to the information processor corresponding to the first identification information when the first identification information is received from the information processor.

11. The method according to claim 8, wherein the storing stores the content, the apparatus identification information, and the first identification information in association with second identification information of a generator of the content, the method further comprising:

first reading-out the first identification information associated with second identification information from the storage device;

second reading-out third identification information associated with the first identification information from the storage device; and second sending the content stored in the storage device, to another information processor corresponding to the third identification information.

12. The method according to claim 8, further comprising:

detecting by the apparatus, the apparatus identification information of another apparatus existing in the vicinity; and storing by the apparatus, the apparatus identification information in association with the content when the content was generated.

13. The method according to claim 12, further comprising: generating by the apparatus, the content.

* * * * *